(12) United States Patent
Sakamoto et al.

(10) Patent No.: US 8,855,873 B2
(45) Date of Patent: Oct. 7, 2014

(54) SHIFT CONTROLLING APPARATUS

(75) Inventors: Naoki Sakamoto, Wako (JP); Dai Arai, Wako (JP); Kosaku Takahashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 10 days.

(21) Appl. No.: 13/610,081

(22) Filed: Sep. 11, 2012

(65) Prior Publication Data

US 2013/0073153 A1 Mar. 21, 2013

(30) Foreign Application Priority Data

Sep. 21, 2011 (JP) ................................ 2011-206085

(51) Int. Cl.
G06F 7/00 (2006.01)
G06F 17/00 (2006.01)
G06F 19/00 (2011.01)
F16H 61/68 (2006.01)

(52) U.S. Cl.
CPC ................ F16H 61/68 (2013.01); G06F 17/00 (2013.01)
USPC .................... 701/52; 701/51; 701/55; 701/66

(58) Field of Classification Search
CPC ................................ F16H 61/68; G06F 17/00
USPC ......................................... 701/52, 51, 55, 66
See application file for complete search history.

(56) References Cited

U.S. PATENT DOCUMENTS

| RE43,857 E * | 12/2012 | Matsunaga et al. ........... 477/120 |
| 2009/0171540 A1* | 7/2009 | Sugiura et al. .................. 701/52 |
| 2009/0240405 A1* | 9/2009 | Tawara ............................ 701/52 |
| 2010/0100289 A1* | 4/2010 | Tawara et al. ................... 701/52 |
| 2012/0059559 A1* | 3/2012 | Tanaka et al. ................... 701/52 |

FOREIGN PATENT DOCUMENTS

JP 3094729 B2 8/2000

* cited by examiner

*Primary Examiner* — Calvin Cheung
*Assistant Examiner* — Paula L Schneider
(74) *Attorney, Agent, or Firm* — Birch, Stewart, Kolasch & Birch, LLP

(57) ABSTRACT

A shift controlling apparatus includes an automatic shift mode returning member with a manual shift mode wherein a transmission is manually shifted and an automatic shift mode wherein the transmission is automatically shifted based on an automatic shift map and changes over. When a manual shift operation is carried out in the automatic shift mode, the shift mode moves to the manual shift mode and then automatically returns to the automatic shift mode after the manual shift operation. The automatic shift mode returning member includes a manual operational detection member for detecting a manual shift operation for shift up or shift down of the transmission during the automatic shift mode, first operational state discrimination member for discriminating an operational state of a vehicle when the manual shift operation is carried out, and second operational state discrimination member for discriminating an operational state of the vehicle after the manual shift operation.

13 Claims, 22 Drawing Sheets

SHIFT CONTROLLING APPARATUS

CROSS-REFERENCE TO RELATED APPLICATIONS

The present application claims priority under 35 USC 119 to Japanese Patent Application No. 2011-206085 filed Sep. 21, 2011 the entire contents of which are hereby incorporated by reference.

BACKGROUND OF THE INVENTION

1. Field of the Invention

This invention relates to a shift controlling apparatus.

2. Description of Background Art

In a shift controlling apparatus that includes a manual shift mode and an automatic shift mode for carrying out a changeover between the shift modes in response to a position of a single shift lever in a transmission of a four-wheeled car, if a driver moves the shift lever to the manual shift position to carry out manual shifting during operation in the automatic shift mode, then the shift mode changes to the manual shift mode, and then if a predetermined period of time elapses after the manual shifting operation is carried out, the shift mode automatically returns to the automatic shift mode. See, for example, Japanese Patent No. 3094729.

More particularly, a changeover operation of the shift mode and a speed changing operation of manual shifting are carried out by the shift lever, and after the manual shift operation, the position of the shift lever returns to the position of the automatic shift mode. Then, a period of time within which the shift lever is not operated after the driver operates the shift lever to carry out the manual shift operation, that is, a period of time within which the shift lever remains at the position of the automatic shift mode, is detected. Then, if the period of time becomes equal to or longer than the predetermined period of time, then the shift mode is returned to the automatic shift mode. Consequently, interruption of the manual shift mode and automatic return to the automatic shift mode are implemented.

However, according to the prior art, in order to prevent the driver from forgetting to changeover from the manual shift mode to the automatic shift after a manual shift operation is carried out in the automatic shift mode, the shift mode is automatically returned to the automatic shift mode when a manual shift operation is not carried out for the predetermined period of time. However, the prior art does not intend automatic return in accordance with an operation of the driver by whom the manual shift mode is interrupted.

SUMMARY AND OBJECTS OF THE INVENTION

Therefore, it is an object of an embodiment of the present invention to provide a shift controlling apparatus that executes, when an interruption operation of a manual shift mode is carried out by a driver in an automatic shift mode, a mode transition method of automatically returning a shift mode from the manual shift mode to the automatic shift mode in accordance with an operation of the driver.

In order to achieve the object described above, the invention according to an embodiment provides a shift controlling apparatus (150) that includes automatic shift mode returning means (218) which has a manual shift mode in which a transmission (168) is manually shifted and an automatic shift mode in which the transmission (168) is automatically shifted based on an automatic shift map (230) in which at least shift timings of the transmission (168) corresponding to different vehicle speeds are set and changes over, when a manual shift operation is carried out in the automatic shift mode, the shift mode to the manual shift mode and then automatically returns the shift mode to the automatic shift mode after the manual shift operation, wherein the automatic shift mode returning means (218) includes manual operation detection means (210) for detecting a manual shift operation for shift up or shift down of the transmission (168) during the automatic shift mode, first operating state discrimination means (214) for discriminating an operational state of a vehicle (12) when the manual shift operation is carried out, and a second operational state discrimination means (214) for discriminating an operational state of the vehicle (12) after the manual shift operation, a state of the automatic return to the automatic shift mode being changed over at least from the manual shift operation for shift up or shift down of the transmission (168) and the operational states upon and after the manual shift operation.

According to an embodiment of the present invention, the automatic shift mode returning means (218) changes over the state of the return to the automatic shift mode based on a shift timing or elapsed time existing in a predetermined shift region in the automatic shift map (230).

According to an embodiment of the present invention, the first operational state discrimination means (214) and the second operational state discrimination means (214) decide to which one of an acceleration operational region, a deceleration operational region and a cruise operational region the operational state belongs.

According to an embodiment of the present invention, the automatic shift mode returning means (218) does not automatically return, if the operational state upon the manual shift operation belongs to the acceleration operational region and a manual shift operation for shifting up the transmission (168) is carried out and then the operational state after the manual shift operation belongs to the acceleration operational region, the shift mode to the automatic shift mode until a shift timing at which the transmission (168) is to be shifted up based on the automatic shift map (230) comes.

According to an embodiment of the present invention, the automatic shift mode returning means (218) automatically returns the shift mode to the automatic shift mode if the operational state upon the manual shift operation belongs to the acceleration operational region and a manual shift operation for shifting upon the transmission (168) is carried out and then, after the operational state after the manual shift operation is placed out of the operational state in the acceleration operational region once, an operational state in the acceleration operational region is established again.

According to an embodiment of the present invention, the automatic shift mode returning means (218) does not automatically return, if the operational state upon the manual shift operation belongs to the acceleration operational region or the cruise operational region and a manual shift operation for shifting down the transmission (168) is carried out and then the operational state after the manual shift operation belongs to the acceleration operational region, the shift mode to the automatic shift mode until a shift timing at which the transmission (168) is to be shifted up based on the automatic shift map (230) after a first predetermined time period elapses after the operational state in the acceleration operational region is entered.

According to an embodiment of the present invention, the first predetermined time period depends upon a shift gear stage after the manual shift operation and is shorter at a shift gear stage for a lower speed.

According to an embodiment of the present invention, the automatic shift mode returning means (218) automatically returns, when the operational state upon the manual shift operation belongs to the acceleration operational region or the cruise operational region and the operational state after the manual shift operation belongs to the deceleration operational region, the shift mode to the automatic shift mode when a second predetermined time period elapses after the operational state in the deceleration operational region is entered.

According to an embodiment of the present invention, the automatic shift mode returning means (218) automatically returns the shift mode to the automatic shift mode if the operational state upon the manual shift operation belongs to the deceleration operational region and the operational state after the manual shift operation belongs to the acceleration operational region.

According to an embodiment of the present invention, the automatic shift mode returning means (218) automatically returns, to whichever one of the operational regions the operational state upon the manual shift operation belongs, if a manual shift operation for shifting down the transmission (168) is carried out and the operational state after the manual shift operation belongs to the cruise operational region, the shift mode to the automatic shift mode when a third predetermined time period elapses after the operational state in the cruise operational region is entered.

According to an embodiment of the present invention, the automatic shift mode returning means (218) automatically returns, to whichever one of the operational regions the operational state upon the manual shift operation belongs, if a manual shift operation for shifting up the transmission (168) is carried out and the operational state after the manual shift operation belongs to the cruise operational region, the shift mode to the automatic shift mode when a fourth predetermined time period elapses after the operational state in the cruise operational region is entered or when a shift timing at which the transmission (168) is to be shifted up based on the automatic shift map (230) comes.

According to an embodiment of the present invention, operational states upon and after a manual shift operation are discriminated, and it is decided from a manual shift operation for shift up or shift down of the transmission and the operational states upon and after the manual shift operation whether or not an automatic return condition to the automatic shift mode is satisfied. Then, if the automatic returning condition is satisfied, then the shift mode is automatically returned to the automatic shift mode. Therefore, the shift mode can be automatically returned to the automatic shift mode in accordance with the operational request of the driver, and the shift mode can be automatically returned to the automatic shift mode without giving an unfamiliar feeling to the driver.

According to an embodiment of the present invention, since the shift mode is returned to the automatic shift mode in response to an automatic shift schedule, shifting which does not conform to the will of the driver at the point in time of returning to the automatic shift mode is not carried out. Therefore, the driver can interrupt a manual shift operation lightheartedly at any time.

According to an embodiment of the present invention, since it is discriminated to which one of the acceleration operational state, the deceleration operational state and the cruise operational state the operational state belongs, the operational request of the driver can be estimated readily, and the shift mode can be returned to an appropriate automatic shift mode conforming to the operational request.

According to an embodiment of the present invention, when a manual shift operation for shifting up the transmission is carried out in an operational state in the acceleration operational region and the operational state in the acceleration operational region after then continues, it is estimated that the driver requests moderate acceleration, and the shift mode is not returned to the automatic shift mode until the vehicle speed and the throttle opening with which shift up is to be carried out are reached. Therefore, kick down is not executed, and the shift mode can be returned to the automatic shift mode while implementing moderate operational requested by the driver.

According to an embodiment of the present invention, if, after a manual shift operation for shifting up the transmission is carried out in an operational state in the acceleration operational region, the operational state is placed out of the operational state belonging to the acceleration operational region once and then is placed into an operational state belonging to the acceleration operational region again, then it is estimated that the driver requests strong acceleration. Thus, it is decided that the automatic shift condition is satisfied, and the shift mode is automatically returned to the automatic shift mode. Therefore, kick down shifting is executed based on the automatic shift map, and it is possible to immediately satisfy the strong acceleration request of the driver.

According to an embodiment of the present invention, if an operational state in the acceleration operational region is entered after a manual operation for shifting down the transmission in an operational state in the acceleration operational region or the cruise operational region, then it is estimated that the driver requests strong acceleration by shifting down the transmission. Then, when the first predetermined time period elapses in the operational state in the acceleration operational region and the vehicle speed and the throttle opening with which the transmission is to be shifted up based on the automatic shift map are reached, the shift mode returns to the automatic shift mode and shift up is carried out. Therefore, such a situation that shift up is carried out immediately and strong acceleration does not continue can be prevented.

According to an embodiment of the present invention, since the first predetermined time period depends upon the gear position after the manual shift operation and is shorter at a shift gear stage for a lower speed, the continuation of high speed rotation of the engine can be prevented.

According to an embodiment of the present invention, in the automatic shift map, if the operational state transits from an operational state in the acceleration operational region or the cruise acceleration region to an operational state in the deceleration operational region, then the transmission is shifted up, but if a manual shift operation is carried out in an operational state in the acceleration operational region or the cruise operational region and then an operational state in the deceleration operational region is entered, then the shift mode does not return to the automatic shift mode until the second predetermined time period elapses. Therefore, shift up is inhibited until the second predetermined time period elapses, and an unfamiliar feeling by complicated shifts is not provided to the driver and cruise operation can be carried out with a shift gear stage manually established by the driver.

According to an embodiment of the present invention, if an operational state in the acceleration operational region is entered after a manual shift operation is carried out in an operational state in the deceleration operational region, then it is estimated that the driver requests strong acceleration and the shift mode is automatically returned to the automatic shift mode immediately. Therefore, kick down shift is executed based on the automatic shift map, and the strong acceleration request of the driver can be satisfied immediately.

According to an embodiment of the present invention, in the automatic shift map, if the operational stage transits to an operational state in the cruise operational region after shift down, then shift up is carried out, but if an operational state in the cruise operational region is entered after a manual operation for shift down is carried out, then the shift mode does not return to the manual shift mode until the third predetermined time period elapses. Therefore, shift up is inhibited until the third predetermined time period elapses, and an unfamiliar feeling by complicated shifts is not provided to the driver and the driver can enjoy a cruise feeling with a shift gear stage by shift down by the driver.

According to an embodiment of the present invention, in the automatic shift map, if the operational stage transits to an operational state in the cruise operational region after shift up, then shift down is carried out, but if an operational state in the cruise operational region is entered after a manual operation for shift up is carried out, then the shift mode does not return to the automatic shift mode until the fourth predetermined time period elapses or until the vehicle speed and the throttle opening with which the transmission is to be shifted up based on the automatic shift map. Therefore, the driver can enjoy a cruise feeling with a shift gear stage by shift up by the driver.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

A shift controlling apparatus according to the present invention is described in detail below in connection with a preferred embodiment with reference to the accompanying drawings.

Figure 1:
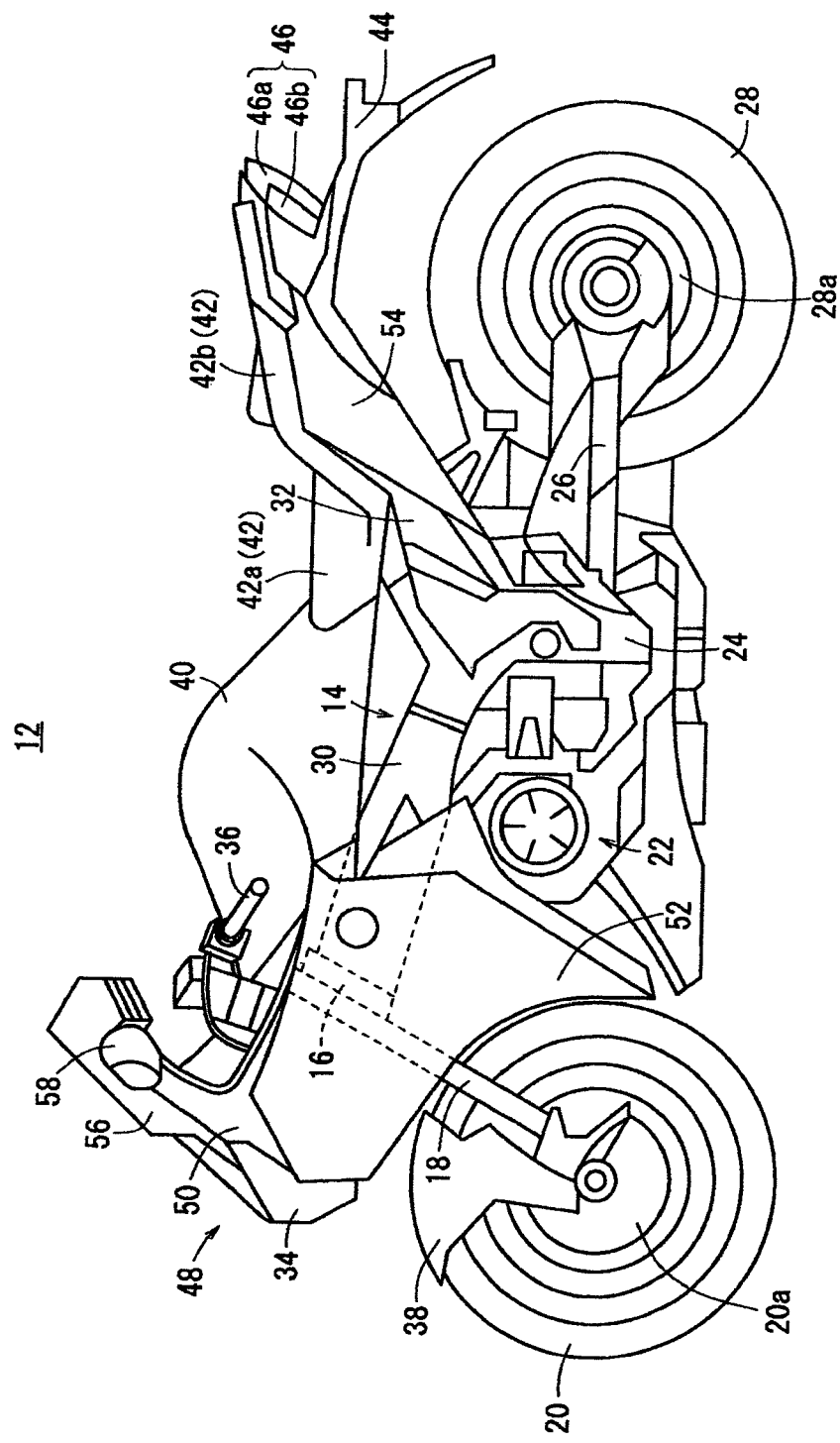
FIG. 1 is a left side elevational view of an appearance of a motorcycle in which a shift controlling apparatus according to an embodiment is incorporated.

FIG. 1 is a left side elevational view of an appearance of a motorcycle (including a bicycle with a prime mover) 12 in which a shift controlling apparatus according to an embodiment is incorporated. It is to be noted that, in order to facilitate understandings of the invention, unless otherwise specified, the forward and backward directions and the upward and downward directions are described with reference to the direction indicated by an arrow mark in FIG. 1 and the leftward and rightward directions are described with reference to a direction as viewed from a driver seated on a vehicle body.

The motorcycle (vehicle) 12 includes a vehicle body frame 14 which configures a vehicle body, a pair of left and right front forks 18 rotatively supported on a head pipe 16 provided at a front end portion of the vehicle body frame 14, a front wheel (steering wheel) 20 attached to the front forks 18, a power unit 22 supported on the vehicle body frame 14 and including an engine, which is a driving source for the motorcycle 12, and an automatic transmission, a swing arm 26 swingably supported at a pivot portion 24 at a lower portion of the vehicle body frame, and a rear wheel (driving wheel) 28 attached to a rear end portion of the swing arm 26.

The vehicle body frame 14 has a pair of main frames 30 extending obliquely downwardly from the head pipe 16, the pivot portion 24 connected to a rear portion of the main frames 30 and extending downwardly, and a pair of left and right seat frames 32 attached to a rear portion of the main frames 30 and extending obliquely rearwardly upwardly.

A headlamp 34 for irradiating light forwardly of the vehicle body is provided at a front portion of the head pipe 16. A handle bar 36 in the form of a bar which can steer the front wheel 20 is attached to an upper portion of the head pipe 16.

The front wheel 20 is rotatively supported at a lower end portion of the front forks 18, and a front wheel brake apparatus (disk brake) 20a for applying braking force to the front wheel 20 is mounted on a side face of the front wheel 20. Further, a front fender 38 for covering the front wheel 20 from above is attached to a lower end portion of the front forks 18.

The power unit 22 is supported fixedly by the main frames 30 and the pivot portion 24. The swing arm 26 extends substantially horizontally rearwardly from the pivot portion 24 and has the rear wheel 28 rotatively supported at a rear end portion of the swing arm 26. A rear wheel brake apparatus (disk brake) 28a for applying braking force to the rear wheel 28 is mounted on a side face of the rear wheel 28.

A fuel tank 40 is provided at an upper portion of the power unit 22, and a seat 42 on which a passenger is to be placed is disposed at an upper portion of the seat frames 32 rearwardly of the fuel tank 40. For the seat 42, a seat of the tandem type is adopted which is configured from a front seat 42a on which the driver is to be seated and a rear seat 42b on which a fellow passenger is to be seated rearwardly of the front seat 42a. To a rear portion of the seat frames 32, a rear fender 44 is attached which extends rearwardly and then extends obliquely downwardly from a lower side of the rear portion of the seat frames 32. A tail lamp unit 46 is attached rearwardly of the seat 42. The tail lamp unit 46 has a brake lamp 46a and rear side winker lamps 46b.

To the motorcycle 12, a vehicle body cover 48 is attached which extends in the forward and backward direction of the vehicle body and configures a design (appearance) of the vehicle body. The vehicle body cover 48 has a front cover 50 which covers the front of the vehicle body, a pair of left and right side cowls 52 extending in the rearward direction from the opposite side faces of the headlamp 34, and a rear cowl 54 extending rearwardly upwardly together with the seat frames 32 and covering the opposite side faces of the seat frames 32. A screen 56 is provided at an upper portion of the front cover 50, and front side winker lamps 58 are attached to the left and right of the front cover 50.

Figure 2:
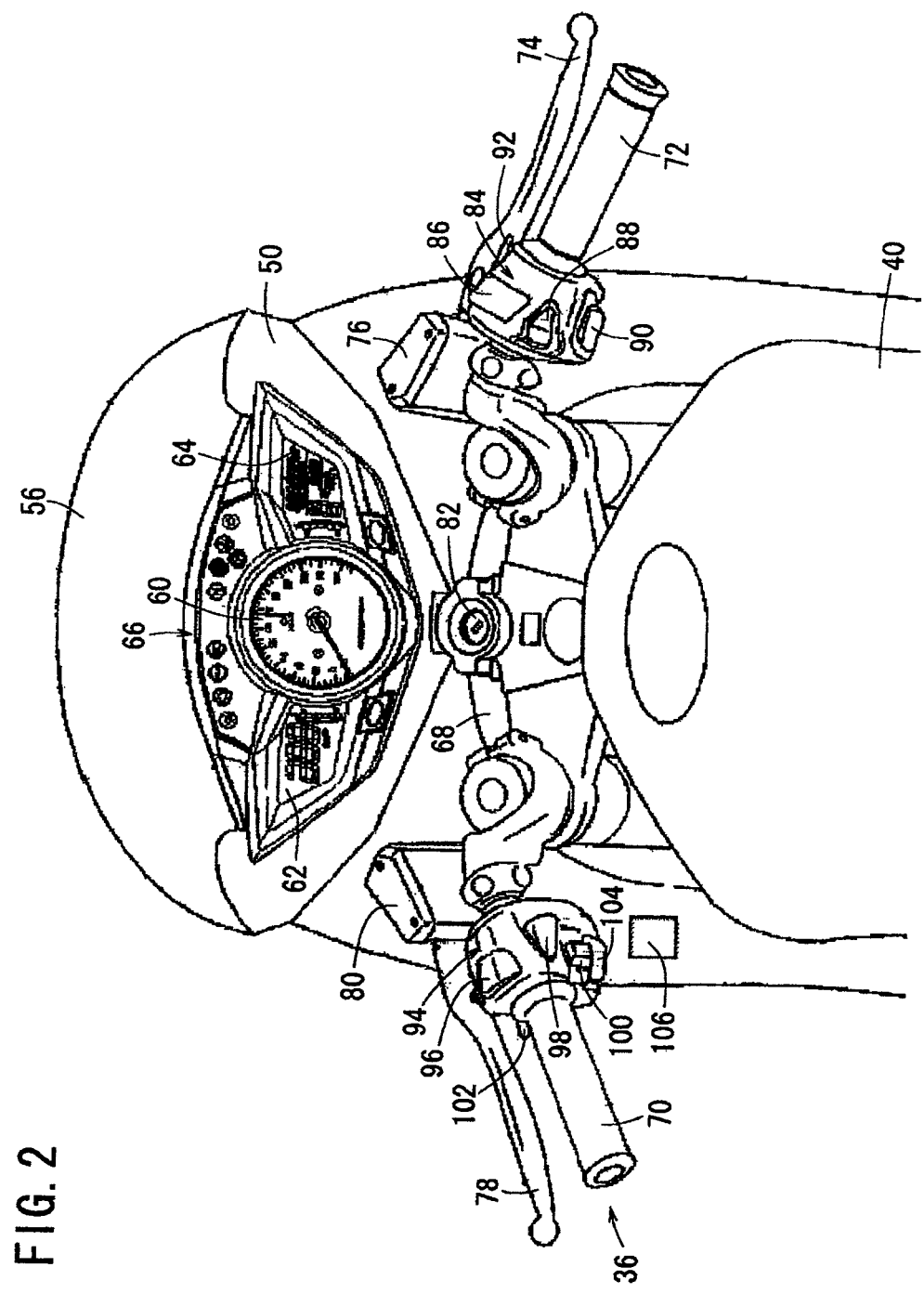
FIG. 2 is a partial enlarged view of the motorcycle shown in FIG. 1.

FIG. 2 is a partial enlarged view of the motorcycle 12 shown in FIG. 1. This view is an overhead view of a region around the steering bar as viewed from rearwardly upwardly of the vehicle body. A meter apparatus 66 having an engine tachometer (tachometer) 60, a left side liquid crystal panel 62 for displaying a vehicle speed and so forth and a right side liquid crystal panel 64 including a distance meter and so forth is attached to the front cover 50 between the screen 56 and the handle bar 36.

The handle bar 36 has a handle shaft 68 extending leftwardly and rightwardly, a left grip 70 disposed at a left end portion of the handle shaft 68, and a right grip 72 disposed at a right end portion of the handle shaft 68. The right grip 72 can turn (rotate) with respect to the handle shaft 68 and indicates an acceleration (increase of the engine speed). The right grip 72 is hereinafter referred to also as throttle grip (acceleration grip). A front wheel brake lever 74 is disposed on the front side of the vehicle body with respect to the throttle grip 72, and a reserve tank 76 for reserving working fluid of a hydraulic brake system is attached to a base portion of the front wheel brake lever 74. Similarly, a rear wheel brake lever 78 is disposed on the front side of the vehicle body with respect to the left grip 70, and a reserve tank 80 for reserving working fluid of the hydraulic brake system is attached to a base portion of the rear wheel brake lever 78. If the driver operates the front wheel brake lever 74, then the front wheel brake apparatus 20a is rendered operative to apply braking force to the front wheel 20. Further, if the driver operates the rear wheel brake lever 78, then the rear wheel brake apparatus 28a is rendered operative to apply braking force to the rear wheel 28.

A main switch 82 is provided at a substantially central portion of the handle bar 36, and a handle switch 84 including various electrical component operating switches is attached to the right side of the handle bar 36 in a neighboring relationship on the center side of the vehicle body with respect to the throttle grip 72. The handle switch 84 includes an engine stop switch 86, an ND changeover switch 88, a starter switch 90 and an operational mode changeover switch 92.

The operational mode changeover switch 92 is a switch for carrying out changeover between an automatic shift mode (AT mode) and a manual shift mode (MT mode). The engine stop switch 86 is a switch for urgently stopping operation of the engine. The automatic shift mode is a mode in which the shift gear stage of the automatic transmission is changed over automatically, and the manual shift mode is a mode in which the shift gear stage of the automatic transmission is changed over manually.

The ND changeover switch 88 changes over the state of the automatic transmission to a neutral "N" state and a drive "D" range state in response to depression thereof on the D side or the left or the N side on the right when the motorcycle 12 stops. If the operational mode changeover switch 92 is operated when the state of the automatic transmission is in the drive range state, then changeover between the automatic shift mode and the manual shift mode is carried out. Further, if the D side of the ND changeover switch 88 is depressed further in the automatic shift mode in the drive mode, then changeover from the drive mode to the sport mode is carried out, but if the N side of the ND changeover switch 88 is depressed in the automatic shift mode in the sport mode, then changeover from the sport mode to the drive mode is carried out. The drive mode and the drive mode are kinds of the automatic shift modes, and the sport mode is an automatic shift mode which attaches more importance to driving force than that in the drive mode. The starter switch 90 is a switch for starting the engine.

On the left side of the handle bar 36, a handle switch 94 including various switches for various electrical components is attached in contact with the left grip 70 on the center side of the vehicle body. The left side handle switch 94 includes an optical axis changeover switch 96 of the headlamp 34, a horn switch 98, a winker switch 100, and a shift up switch 102 and a shift down switch 104 for manually carrying out a shifting operation of the automatic transmission in the automatic shift mode. A traction off switch 106 is provided. It is to be noted that, if one of the shift up switch 102 and the shift down switch 104 is operated in the automatic shift mode, then the shift mode is changed over to the manual shift mode.

Figure 3:
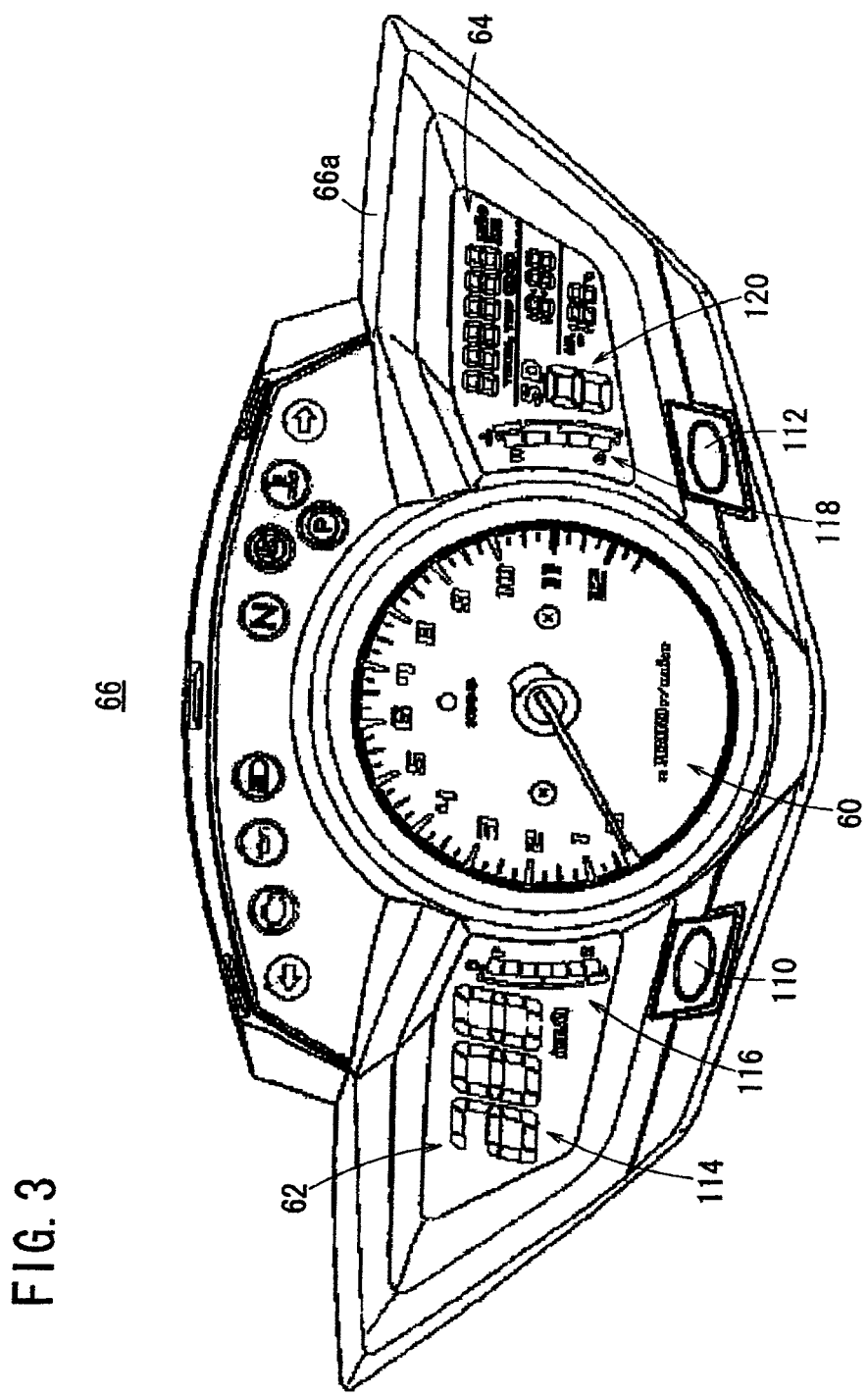
FIG. 3 is a front elevational view of a meter apparatus.

FIG. 3 is a front elevational view of the meter apparatus 66. The meter apparatus 66 has the engine tachometer 60, left side liquid crystal panel 62 and right side liquid crystal panel 64 disposed on a housing 66a thereof. Below the left side liquid crystal panel 62 and the right side liquid crystal panel 64, operation switches 110 and 112 for carrying out changeover of the display, display resetting and so forth are provided.

The left side liquid crystal panel 62 includes a speedometer 114 for displaying a vehicle speed of the motorcycle 12 and a fuel gauge 116 for displaying a fuel remaining amount. On the right side liquid crystal panel 64, a plurality of displaying functions are provided in addition to a water temperature gauge 118 and a gear position display section 120 for displaying a shift gear stage at present.

Figure 4:
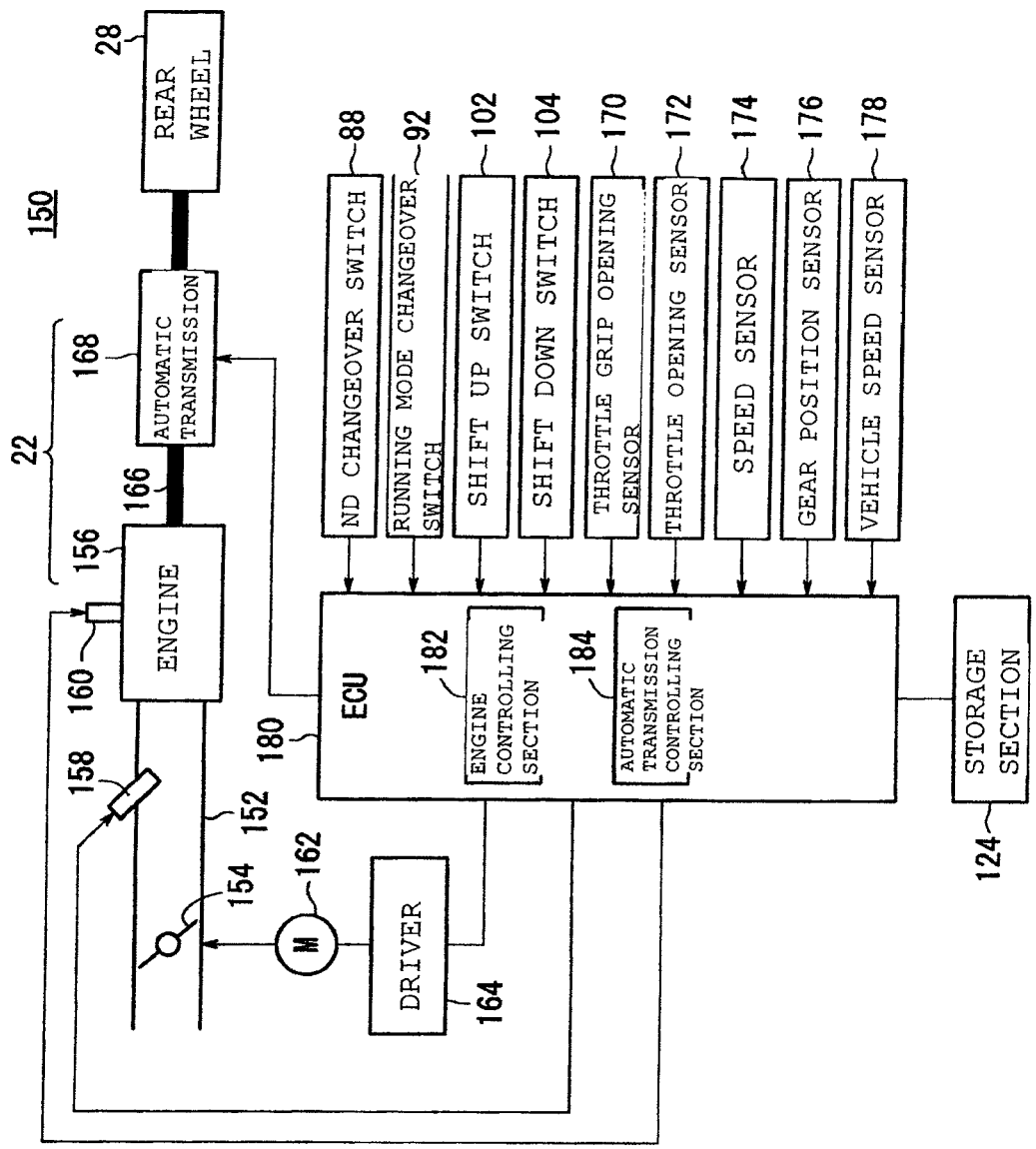
FIG. 4 is a block diagram of the shift controlling apparatus.

FIG. 4 is a block diagram of a shift controlling apparatus 150. A throttle valve (intake air amount adjustment means) 154 provided in an intake pipe 152 adjusts the intake air amount to be taken into an engine 156. An injector (fuel injection apparatus) 158 for injecting fuel into air which is to flow into a combustion chamber of the engine 156 through the throttle valve 154 to produce air fuel mixture is provided for the intake pipe 152. An ignition plug (ignition apparatus) 160 for igniting air fuel mixture having flowed into the combustion chamber is provided in the engine 156. When the ignition plug 160 carries out ignition, the air mixture fuel in the combustion chamber is burnt, and the engine 156 converts the energy on the combustion into power.

A motor 162 adjusts the opening of the throttle valve 154 and is driven by a driver 164. A crankshaft 166 which is an output power shaft of the engine 156 is connected to the rear wheel 28 through an automatic transmission (speed change gear) 168. The automatic transmission 168 has a plurality of shift gear stages, and automatically changes over the shift gear stage in response to the vehicle speed and the throttle opening and transmits rotating power transmitted thereto to the rear wheel 28 changing the change gear ratio (reduction gear ratio).

The shift controlling apparatus 150 has a throttle grip opening sensor (throttle grip opening detection means) 170 for detecting the opening of the throttle grip 72, a throttle opening sensor (throttle opening detection means) 172 for detecting the opening (throttle opening) of the throttle valve 154, a speed sensor 174 for detecting the speed of rotation (engine speed) of the crankshaft 166 of the engine 156, a gear position sensor 176 for detecting the gear position (shift gear stage at present) of the automatic transmission 168, and a vehicle speed sensor (vehicle speed detection means) 178 for detecting the speed of rotation of the rear wheel 28 thereby to detect the vehicle speed of the motorcycle 12. Signals detected by the throttle grip opening sensor 170, throttle opening sensor 172, speed sensor 174, gear position sensor 176 and vehicle speed sensor 178 are sent to an ECU (control section) 180. Also operation signals of the ND changeover switch 88, operational mode changeover switch 92, shift up switch 102 and shift down switch 104 are sent to the ECU 180. The various sensors described above detect in a fixed period.

The ECU 180 has an engine controlling section 182 for controlling driving of the engine 156, and an automatic transmission controlling section 184 for controlling driving of the automatic transmission 168. A storage section 124 is a storage medium for storing a program, data and so forth. The ECU 180 has a memory, a CPU (computer) and so forth, and the CPU functions as the ECU 180 in the present embodiment by reading in the program stored in the storage section 124.

The engine controlling section 182 adjusts the throttle opening in response to the opening of the throttle grip 72 detected by the throttle grip opening sensor 170, and controls the fuel ignition amount and the injection timing of the injector 158 and the ignition timing of the ignition plug 160 based on the throttle opening (or the opening of the throttle grip 72), the vehicle speed detected by the vehicle speed sensor 178 and so forth to control the engine speed.

The automatic transmission controlling section 184 controls driving of the automatic transmission 168 based on a plurality of shift maps stored in the storage section 124.

Figure 5:
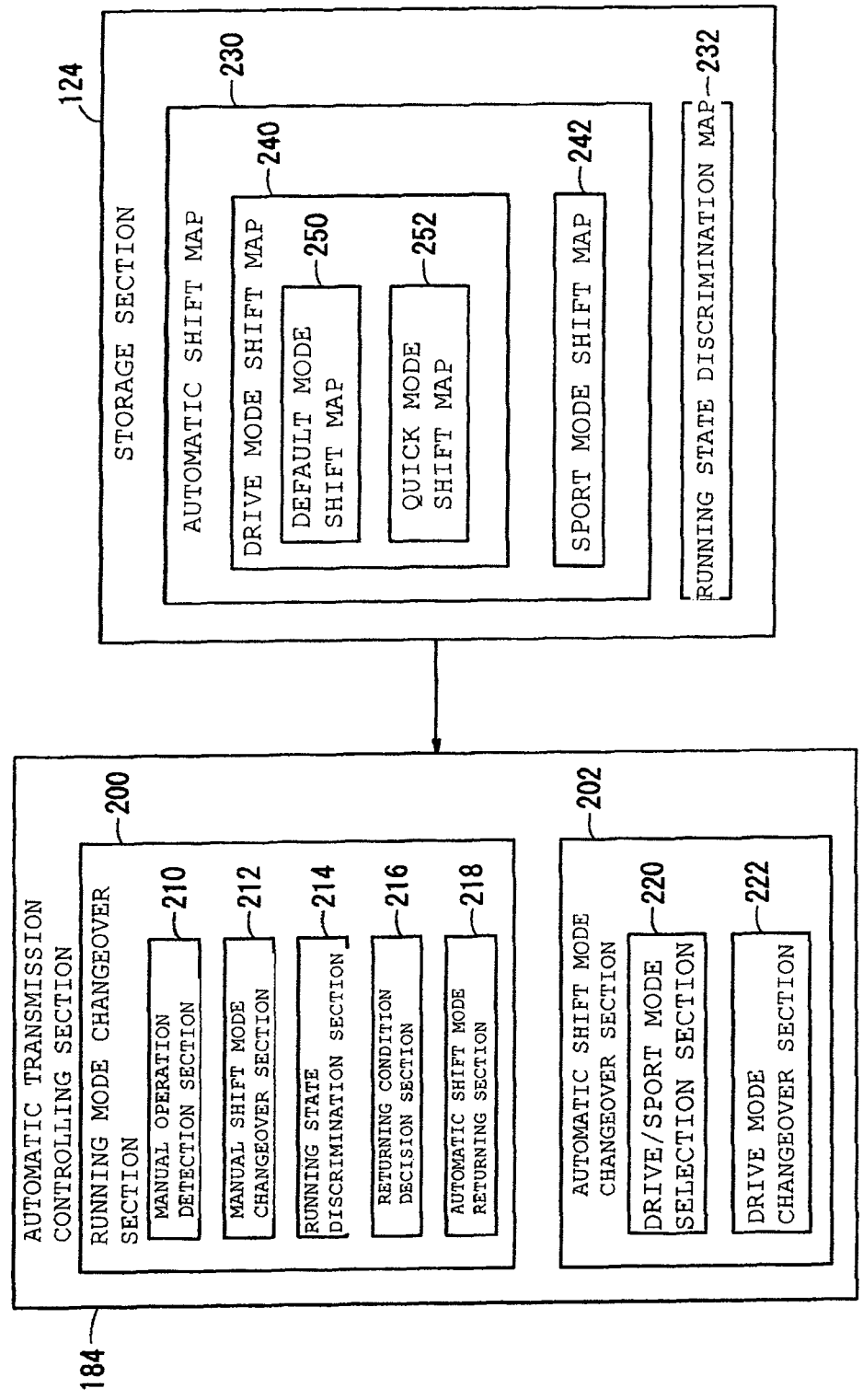
FIG. 5 is a functional block diagram of an automatic transmission controlling section and a storage section.

FIG. 5 is a functional block diagram showing a configuration of the automatic transmission controlling section 184 and the storage section 124. The automatic transmission controlling section 184 has an operational mode changeover section 200 and an automatic shift mode changeover section 202. The operational mode changeover section (automatic shift mode returning means) 200 has a manual operation detection section 210, a manual shift mode changeover section 212, an operational state discrimination section 214, a returning condition decision section 216 and an automatic shift mode returning section 218. The automatic shift mode changeover section 202 has a drive/sport mode selection section 220 and a drive mode changeover section 222.

The storage section 124 has an automatic shift map 230 and an operational state discrimination map 232. The automatic shift map 230 has a drive mode shift map 240 and a sport mode shift map 242, and the drive mode shift map 240 further has a default mode shift map (first mode shift map) 250 and a quick mode shift map (second mode shift map) 252.

Figure 6:
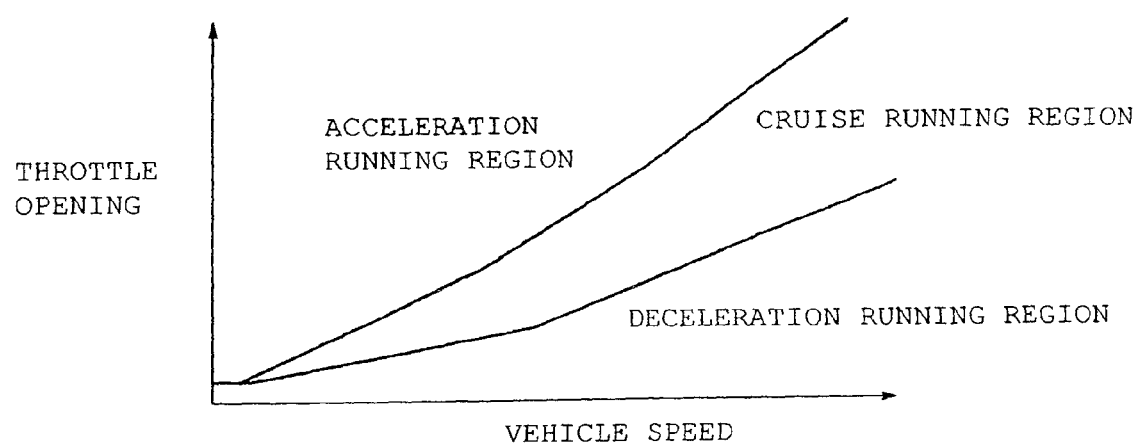
FIG. 6 is a view illustrating an operational state discrimination map.

FIG. 6 is a view illustrating the operational state discrimination map 232. As seen in FIG. 6, the operational state discrimination map 232 is partitioned into an acceleration operational region, a cruise operational region and a deceleration operational region in accordance with the throttle opening and the vehicle speed. Accordingly, by using the operational state discrimination map 232, it is possible to decide to which one of the acceleration operational region, cruise operational region and deceleration operational region the operational state of the motorcycle 12 belongs from the throttle opening and the vehicle speed at present.

Figure 7:
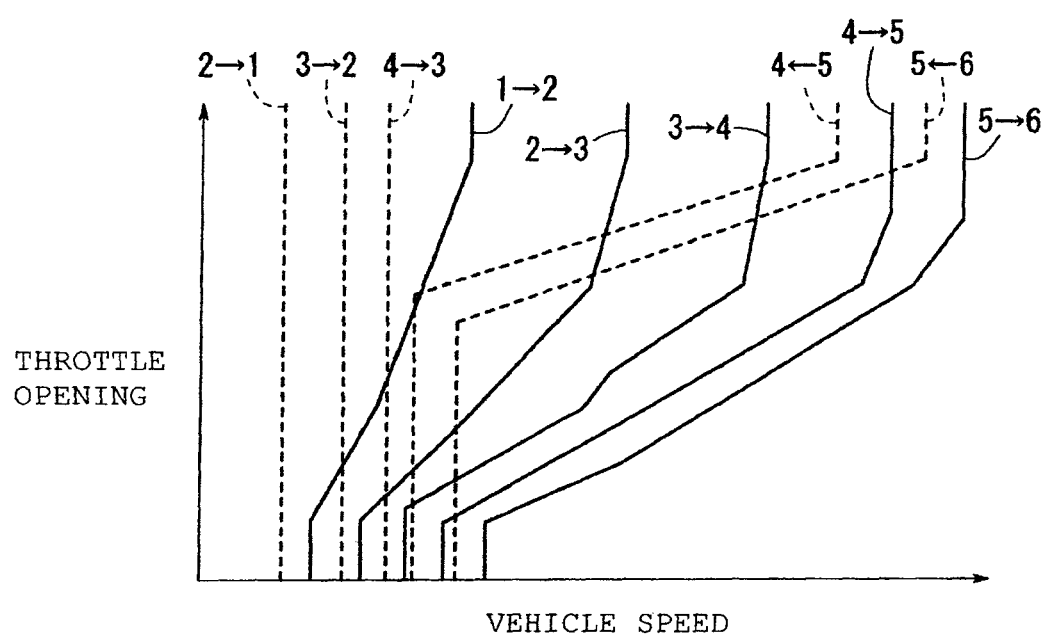
FIG. 7 is a view showing a default mode shift map.

FIG. 7 is a view illustrating the default mode shift map 250, in which a vehicle speed timing of the automatic transmission 168 is set in response to the throttle opening and the vehicle speed.

Solid lines in FIG. 7 indicate shift timings at which the shift gear stage changes over to the higher speed side, and broken lines indicate shift timings at which the shift gear stage changes over to the lower speed side. As seen in FIG. 7, as the shift timings at which the shift gear stage changes over to the higher speed side, a shift timing at which the shift gear stage changes over from the shift gear stage of the first speed to the shift gear stage of the second speed, a shift timing at which the shift gear stage changes over from the shift gear stage of the second speed to the shift gear stage of the third speed, a shift timing at which the shift gear stage changes over from the shift gear stage of the third speed to the shift gear stage of the fourth speed, a shift timing at which the shift gear stage changes over from the shift gear stage of the fourth speed to the shift gear stage of the fifth speed, and a shift timing at which the shift gear stage changes over from the shift gear stage of the fifth speed to the shift gear stage of the sixth speed are set.

Further, as the shift timings at which the shift gear stage changes over to the lower speed side, a shift timing at which the shift gear stage changes over from the shift gear stage of the sixth speed to the shift gear stage of the fifth stage, a shift timing at which the shift gear stage changes over from the shift gear stage of the fifth speed to the shift gear stage of the fourth speed, a shift timing at which the shift gear stage changes over from the shift gear stage of the fourth speed to the shift gear stage of the third speed, a shift timing at which the shift gear stage changes over from the shift gear stage of the third speed to the shift gear stage of the second speed, and a shift timing at which the shift gear stage changes over from the shift gear stage of the second speed to the shift gear stage of the first speed are set.

The automatic transmission controlling section 184 uses, when the automatic shift mode is the default mode (first mode), the default mode shift map 250 to control driving of the automatic transmission 168 to automatically change over the shift gear stage.

Figure 8:
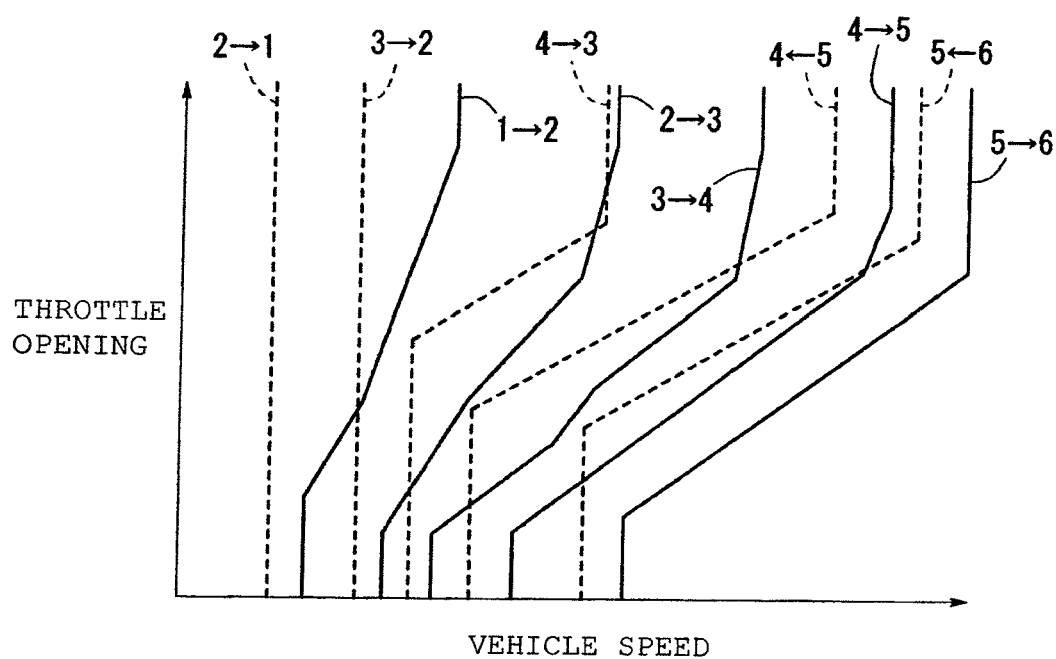
FIG. 8 is a view showing a quick mode shift map.

FIG. 8 is a view illustrating the quick mode shift map 252, in which the shift timing of the automatic transmission 168 is set in accordance with the throttle opening and the vehicle speed similarly as in the default mode shift map 250 illustrated in FIG. 7. Solid lines in FIG. 8 indicate shift timings at which the shift gear stage is changed over to the higher speed side, and broken lines indicate shift timings at which the shift gear stage changes over to the lower speed side.

The quick mode shift map 252 is a shift map which attaches importance to the driving force in comparison with the default mode shift map 250. In the quick mode shift map 252, a region in which the change gear ratio is low is greater than that in the default mode shift map 250 as hereinafter described, and consequently, at least the shift timing at which the shift gear stage changes over to the higher speed side is delayed from that in the default mode shift map 250.

More particularly, in the quick mode shift map 252, the shift timing at which the shift gear stage is changed over to the higher speed side based on the vehicle speed is set so as to be later than that in the default mode shift map 250. In particular, the vehicle speeds at the shift timing at which the shift gear stage changes over from the first speed to the second speed, from the second speed to the third speed, from the third speed to the fourth speed, from the fourth speed to the fifth speed and from the fifth speed to the sixth speed are set higher in the quick mode shift map 252 than in the default mode shift map 250. Accordingly, even if the motorcycle 12 operates at a vehicle speed of a shift timing at which the shift gear stage changes over to the higher speed side (for example, from the third speed to the fourth speed) in the default mode shift map 250, the shift gear stage does not change over to the higher speed side (for example, from the third speed to the fourth speed) in the quick mode shift map 252, but after a higher vehicle speed than the vehicle speed just mentioned is reached, the shift gear stage changes over to the higher speed side (for example, from the third speed to the fourth speed). Therefore, the shift timing becomes later than that in the default mode shift map 250.

The automatic transmission controlling section 184 uses, when the automatic shift mode is the quick mode (second mode), the quick mode shift map 252 to control driving of the automatic transmission 168 to automatically change over the shift gear stage.

Figure 9:
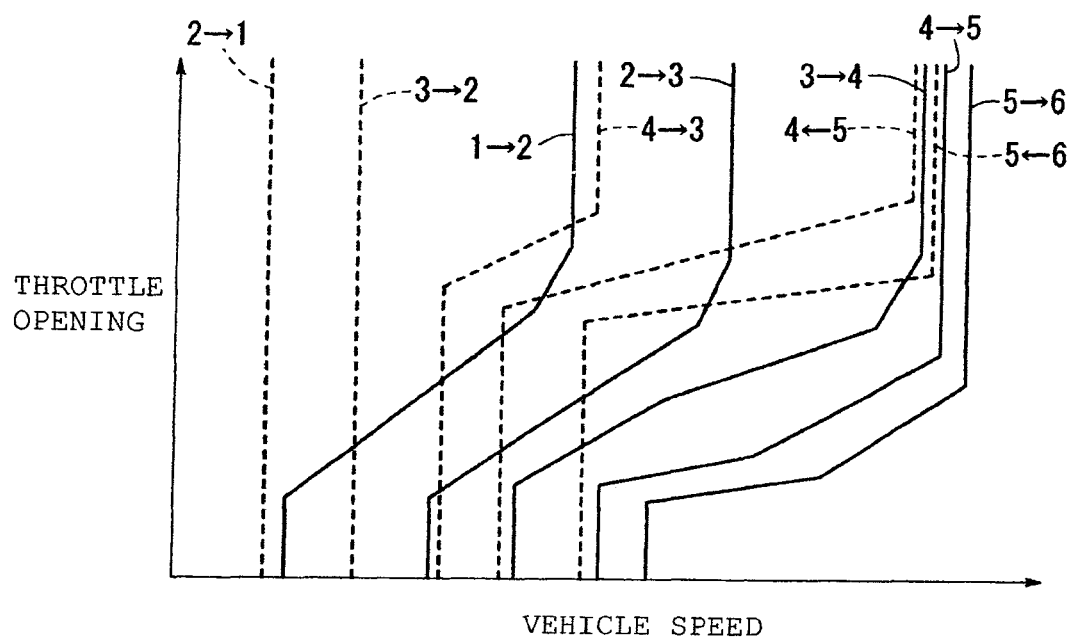
FIG. 9 is a view showing a sport mode shift map.

FIG. 9 is a view illustrating the sport mode shift map 242, in which the shift timing of the automatic transmission 168 is set in accordance with the throttle opening and the vehicle speed similarly as in the default mode shift map 250 in FIG. 7 and the quick mode shift map 252 illustrated in FIG. 8. Solid lines in FIG. 9 indicate shift timings at which the shift gear stage changes over to the higher speed side, and broken lines indicate shift timings at which the shift gear stage changes over to the lower speed side.

The sport mode shift map 242 is a shift map corresponding to sporty operational which attaches importance to the driving force in comparison with the quick mode shift map 252. In the sport mode shift map 242, the region in which the change gear ratio is low is greater than that in the quick mode shift map 252 as hereinafter described. Consequently, at least the shift timing at which the shift gear stage changes over to the higher speed side is delayed from that in the quick mode shift map 252.

More particularly, in the sport mode shift map 242, the shift timing at which the shift gear stage is changed over to the higher speed side based on the vehicle speed is set so as to be later than that in the default mode shift map 250. In particular, the vehicle speeds at the shift timing at which the shift gear stage changes over from the first speed to the second speed, from the second speed to the third speed, from the third speed to the fourth speed, from the fourth speed to the fifth speed and from the fifth speed to the sixth speed are set higher in the sport mode shift map 242 than in the quick mode shift map 252. Accordingly, even if the motorcycle 12 operates at a vehicle speed of a shift timing at which the shift gear stage changes over to the higher speed side (for example, from the third speed to the fourth speed) in the quick mode shift map 252, the shift gear stage does not change over to the higher speed side (for example, from the third speed to the fourth speed) in the sport mode shift map 242, but after a higher vehicle speed than the vehicle speed just mentioned is reached, the shift gear stage changes over to the higher speed side (for example, from the third speed to the fourth speed). Therefore, the shift timing becomes later than that in the sport mode shift map 242.

The automatic transmission controlling section 184 uses, when the automatic shift mode is the sport mode, the sport mode shift map 242 to control driving of the automatic transmission 168 to automatically change over the shift gear stage.

Figure 10:
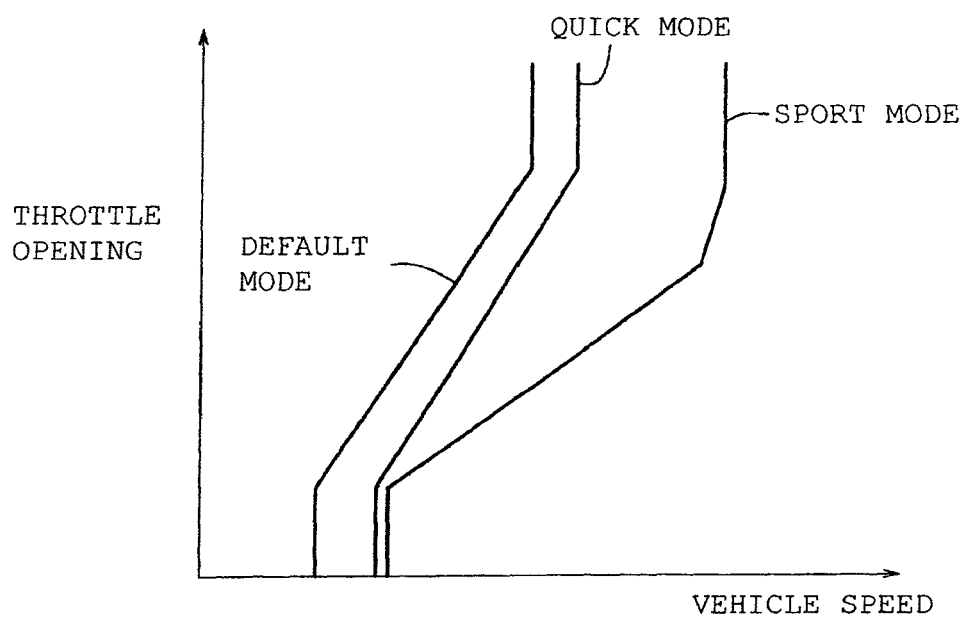
FIG. 10 is a view illustrating a shift timing upon shifting from the first speed to the second speed of the default mode shift map, quick mode shift map and sport mode shift map.

FIG. 10 is a view illustrating shift timings at which the shift gear stage changes over from the first speed to the second speed in the default mode shift map 250, quick mode shift map 252 and sport mode shift map 242. As seen in FIG. 10, the quick mode shift map 252 has a greater region in which the change gear ratio is low than the default mode shift map 250, and the sport mode shift map 242 has a greater region in which the change gear ratio is low than the quick mode shift map 252. It is to be noted that, while, in FIG. 10, the shift timings at which the shift gear stage changes over from the first stage to the second stage in the default mode shift map 250, quick mode shift map 252 and sport mode shift map 242 are taken as an example, the foregoing applies similarly also to the speed changes from the second speed to the third speed, from the third speed to the fourth speed, from the fourth speed to the fifth speed and from the fifth speed to the sixth speed.

Referring back to the description of FIG. 5, the automatic transmission controlling section 184 changes over the state of the automatic transmission 168 between the neutral state and the drive range state in response to an operation of the ND changeover switch 88.

The manual operation detection section (manual operation detection means) 210 of the operational mode changeover section 200 detects whether or not the shift up switch 102 or the shift down switch 104 is operated by the driver (whether or not a manual shifting operation for shift up or shift down is carried out). More particularly, if an operation signal is sent from the shift up switch 102 or the shift down switch 104, then the manual operation detection section 210 detects that the shift up switch 102 or the shift down switch 104 is operated.

The manual shift mode changeover section 212 of the operational mode changeover section 200 changes over the shift mode from the automatic shift mode to the manual shift mode if one of the operational mode changeover switch 92, shift up switch 102 and shift down switch 104 is operated while the automatic transmission 168 is in the drive range stage and the automatic shift mode of the sport mode or the drive mode is set. If the manual shift mode is set, then the automatic transmission controlling section 184 changes over the shift gear stage of the automatic transmission 168 in response to an operation of the shift up switch 102 or the shift down switch 104 by the driver. Accordingly, if the manual shift mode is set, the shift gear stage is not automatically changed over.

The operational speed discrimination section (first operational state discrimination means, second operational state discrimination means, operational state discrimination means) 214 of the operational mode changeover section 200 discriminates, from the throttle opening and the vehicle speed when one of the shift up switch 102 and the shift down switch 104 is operated (when one of a manual shifting operation for shift up and a manual shifting operation for shift down is carried out), the operational state of the motorcycle 12 when the manual operation is carried out using the operational state discrimination map 232. Further, the operational state discrimination section 214 uses the operational state discrimination map 232 to discriminate, from the throttle opening and the vehicle speed after one of the shift up switch 102 and the shift down switch 104 is operated, the operational state of the motorcycle 12 after the manual operation.

For example, if the throttle opening and the vehicle speed when the shift up switch 102 or the shift down switch 104 is operated is within the acceleration operational region of the operational state discrimination map 232, then it is decided that the operational state of the motorcycle 12 belongs to the acceleration operational region. It is to be noted that, if the shift up switch 102 or the shift down switch 104 is operated to change over the shift mode to the manual shift mode, then the operational state discrimination section 214 discriminates the operational state of the motorcycle 12, but if the operational mode changeover switch 92 is operated to change over the shift mode to the manual shift mode, the operational state discrimination section 214 does not discriminate the operational state of the motorcycle 12.

The returning condition decision section (returning condition decision means) 216 of the operational mode changeover section 200 decides, from an operation of the shift up switch 102 or the shift down switch 104 and the operational state at or after a manual shifting operation discriminated by the operational state discrimination section 214, whether or not an automatic returning condition to the automatic shift mode is satisfied. It is to be noted that, when the shift up switch 102 or the shift down switch 104 is operated to change over the shift mode to the manual shift mode, the returning condition decision section 216 decides whether or not the automatic returning condition is satisfied, but if the operational mode changeover switch 92 is operated to change over the shift mode to the manual shift mode, the returning condition decision section 216 does not decide whether or not the automatic returning condition is satisfied.

The automatic shift mode returning section 218 of the operational mode changeover section 200 automatically returns the shift mode from the manual shift mode to the automatic shift mode if it is decided by the returning condition decision section 216 that the automatic returning condition is satisfied. At this time, the automatic shift mode returning section 218 returns the shift mode to the automatic shift mode of the drive mode when the automatic shift mode before the change over to the manual shift mode is the drive mode, but automatically returns the shift mode to the automatic shift mode of the sport mode when the automatic shift mode before the changeover to the manual shift mode is the sport mode. In other words, the shift mode is automatically returned to the automatic shift mode same as that in the preceding operation cycle. Further, if the operational mode changeover switch 92 is operated while the shift mode is set to the manual shift mode, the automatic shift mode returning section 218 changes over the shift mode from the manual shift mode to the automatic shift mode. If the shift mode automatically returns to the automatic shift mode, then the automatic transmission controlling section 184 changes over the shift gear stage of the automatic transmission 168 based on the automatic shift map 230 (one of the drive mode shift map 240 and the sport mode shift map 242).

The drive/sport mode selection section (mode selection means) 220 of the automatic shift mode changeover section 202 selects one of the automatic shift mode of the drive mode and the automatic shift mode of the sport mode in response to an operation of the ND changeover switch 88. By selecting the drive mode shift map 240, the drive/sport mode selection section 220 selects the automatic shift mode of the drive mode, but by selecting the sport mode shift map 242, the drive/sport mode selection section 220 selects the automatic shift mode of the sport mode. The automatic transmission controlling section 184 automatically changes over the shift gear stage of the automatic transmission 168 based on the drive mode shift map 240 if the automatic shift mode of the drive mode is selected by the drive/sport mode selection section 220, but automatically changes over the shift gear stage of the automatic transmission 168 based on the sport mode shift map 242 if the automatic shift mode of the sport mode is selected by the drive/sport mode selection section 220.

The drive mode changeover section (drive mode map changeover means) 222 of the automatic shift mode changeover section 202 carries out changeover between the default mode and the quick mode when the automatic shift mode of the drive mode is selected by the drive/sport mode selection section 220. As a rule, when the automatic shift mode of the drive mode is selected, the default mode is used, and the drive mode changeover section 222 carries out changeover between the default mode and the quick mode based on an acceleration history based on the throttle opening.

The drive mode changeover section 222 changes over the selection of the default mode shift map 250 or the quick mode shift map 252 to carry out changeover between the default mode and the quick mode. In particular, the drive mode changeover section 222 establishes the quick mode by selecting the quick mode shift map 252, but establishes the default mode by selecting the default mode shift map 250.

Figure 11:
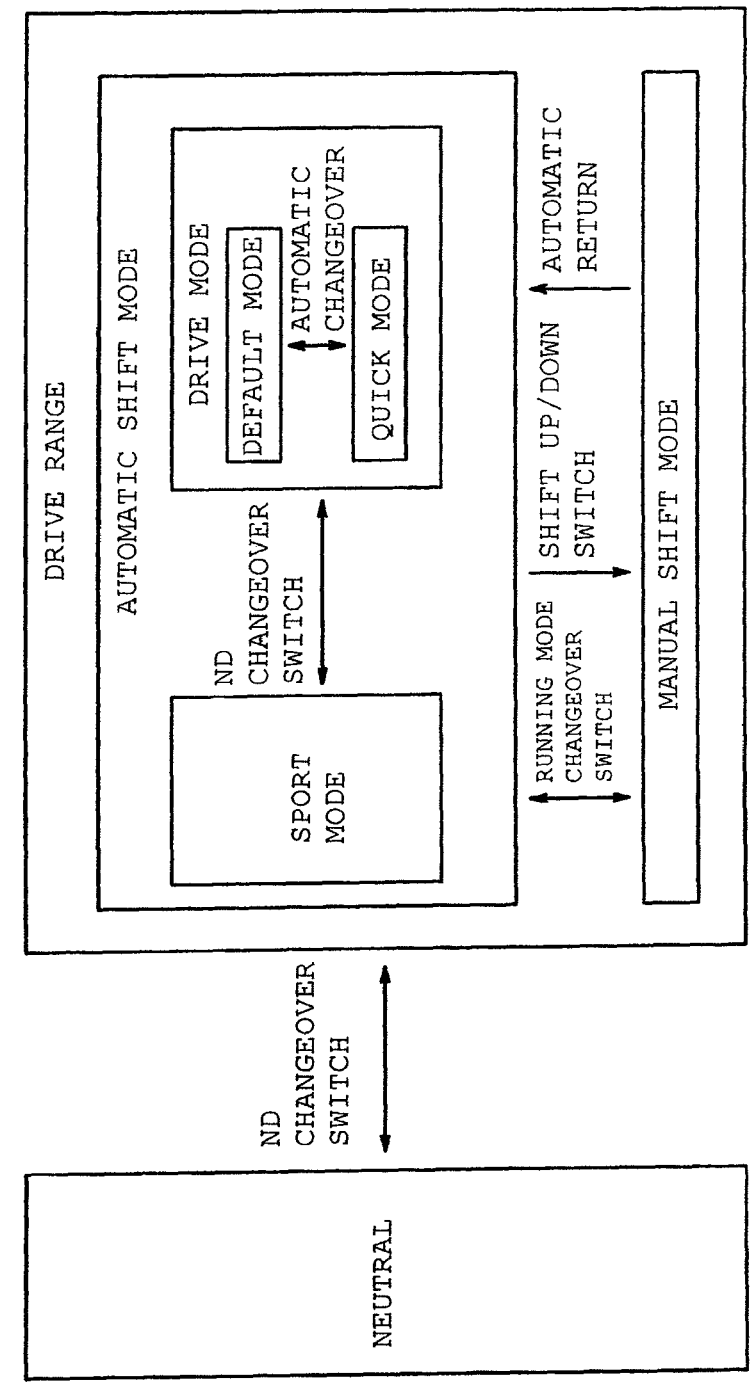
FIG. 11 is a block diagram illustrating changeover between an automatic shift mode and a manual shift mode, between the automatic shift mode of a drive mode and the automatic shift mode of a sport mode and between a default mode and a quick mode.

FIG. 11 is a conceptive view illustrating changeover between the automatic shift mode and the manual shift mode, changeover between the automatic shift mode of the drive mode and the automatic shift mode of the sport mode and changeover between the default mode and the quick mode in the present embodiment.

The neutral range and the drive range are changed over therebetween by the ND changeover switch 88. Then, when the state of the automatic transmission 168 is the drive range state, the operational mode changeover section 200 carries out changeover between the automatic shift mode and the manual shift mode in response to an operation of the operational mode changeover switch 92. Further, if, in the automatic shift mode, one of the shift up switch 102 and the shift down switch 104 is operated, then the manual shift mode changeover section 212 of the operational mode changeover section 200 changes over the shift mode to the manual shift mode. After the shift mode is changed over to the manual shift mode by the shift up switch 102 or the shift down switch 104, if the automatic returning condition is satisfied, then the automatic shift mode returning section 218 automatically returns (changes over the shift mode) to the automatic shift mode. In response to an operation of the ND changeover switch 88, the drive/sport mode selection section 220 of the automatic shift mode changeover section 202 changes over the shift mode to the automatic shift mode of the drive mode and the automatic shift mode of the sport mode by selecting the same. When the shift mode is the automatic shift mode of the drive mode, the default mode is established in principle, and the drive mode changeover section 222 automatically carries out changeover between the default mode and the quick mode based on an acceleration history based on the throttle opening.

Figure 18:
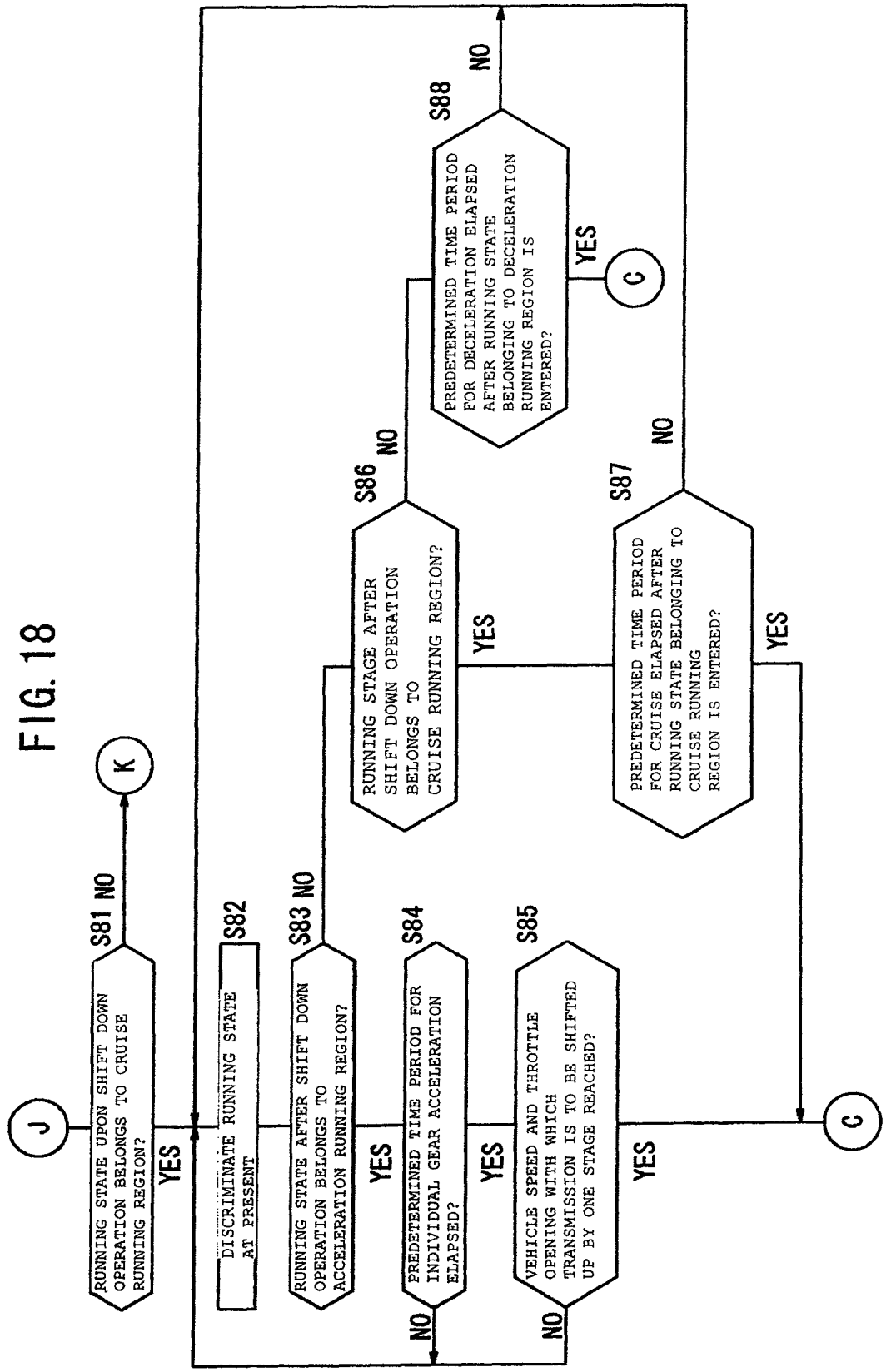
FIG. 18 is a flow chart illustrating operation of automatic returning from the manual shift mode to the automatic shift mode.
Figure 19:
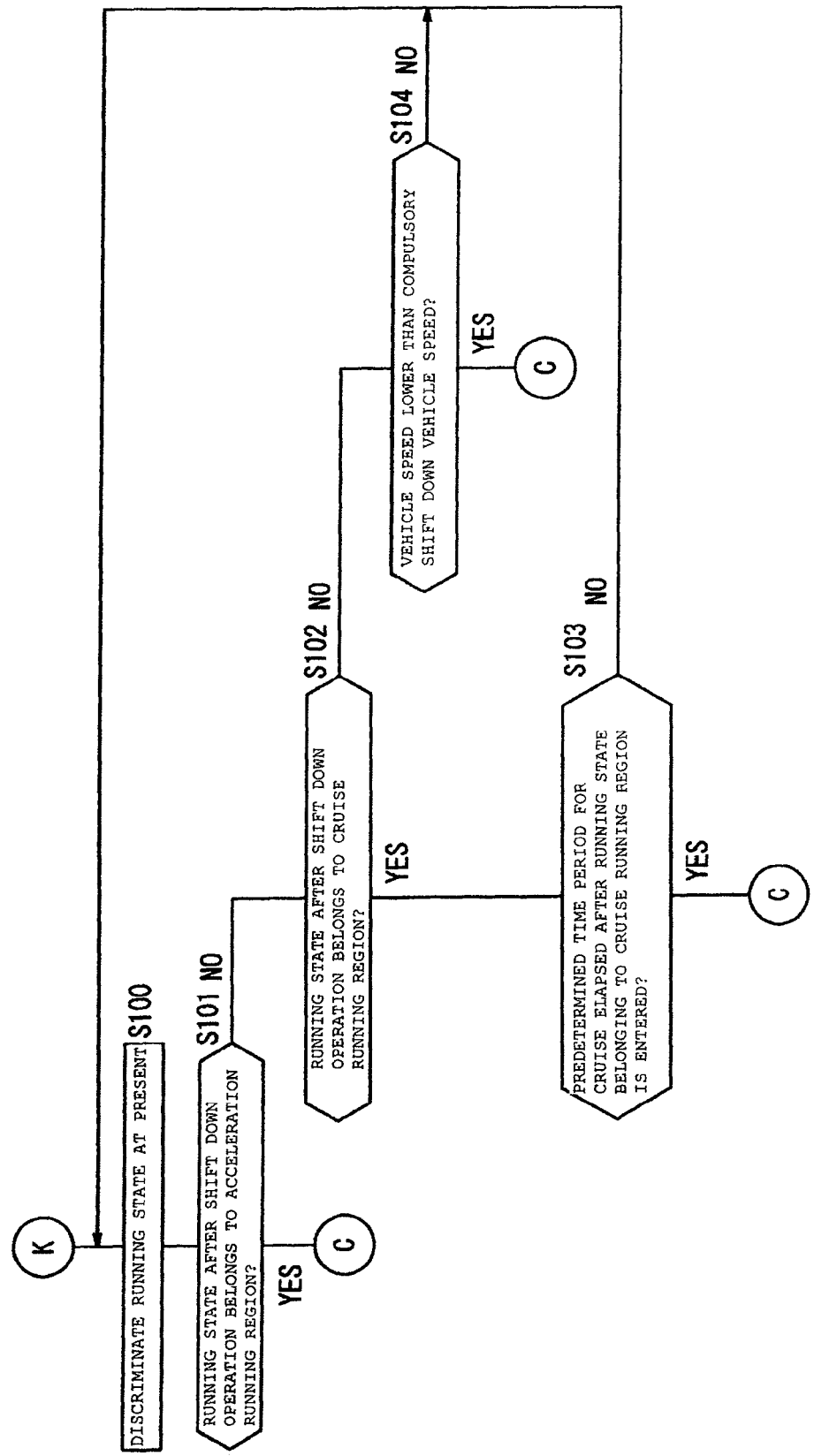
FIG. 19 is a flow chart illustrating operation of automatic returning from the manual shift mode to the automatic shift mode.
Figure 20:
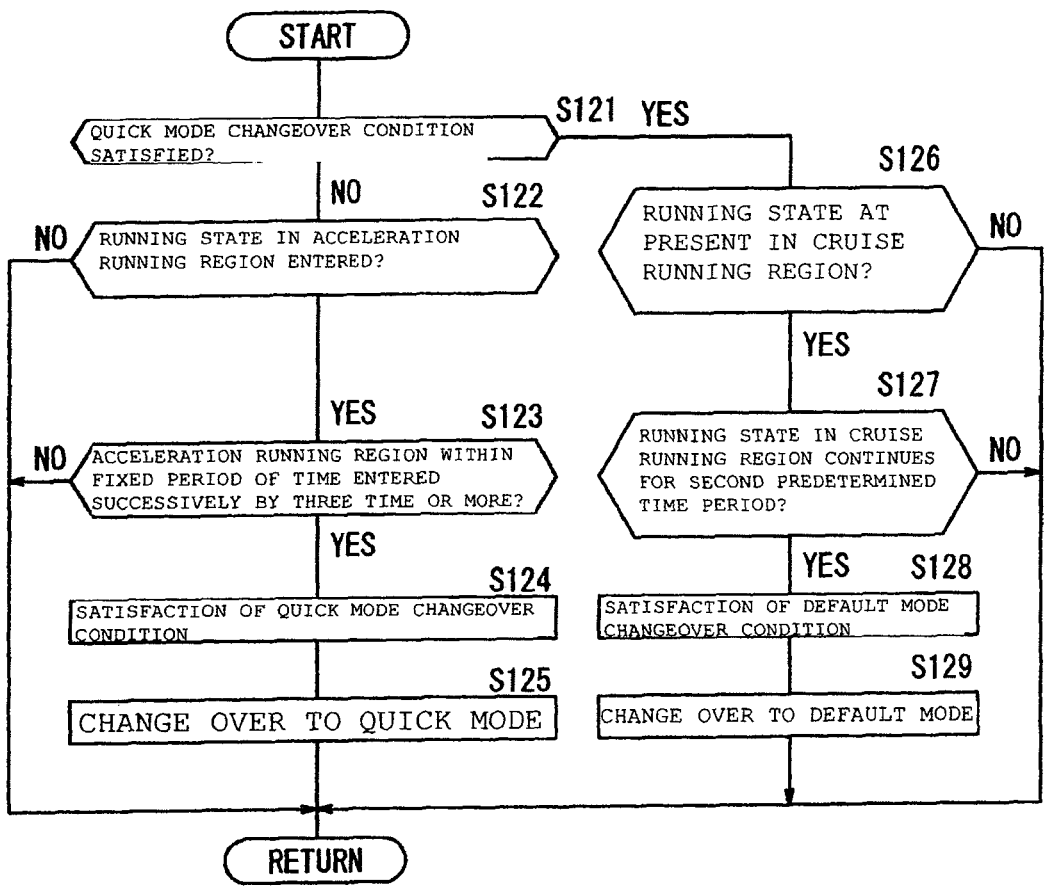
FIG. 20 is a flow chart illustrating changeover operation between the default mode and the quick mode.

Now, the operation of the shift controlling apparatus 150 is described in accordance with flow charts shown in FIGS. 12 to 20. FIGS. 12 to 19 represent automatic returning operation from the manual shift mode to the automatic shift mode, and FIG. 20 is a flow chart illustrating changeover operation between the default mode and the quick mode.

Figure 21:
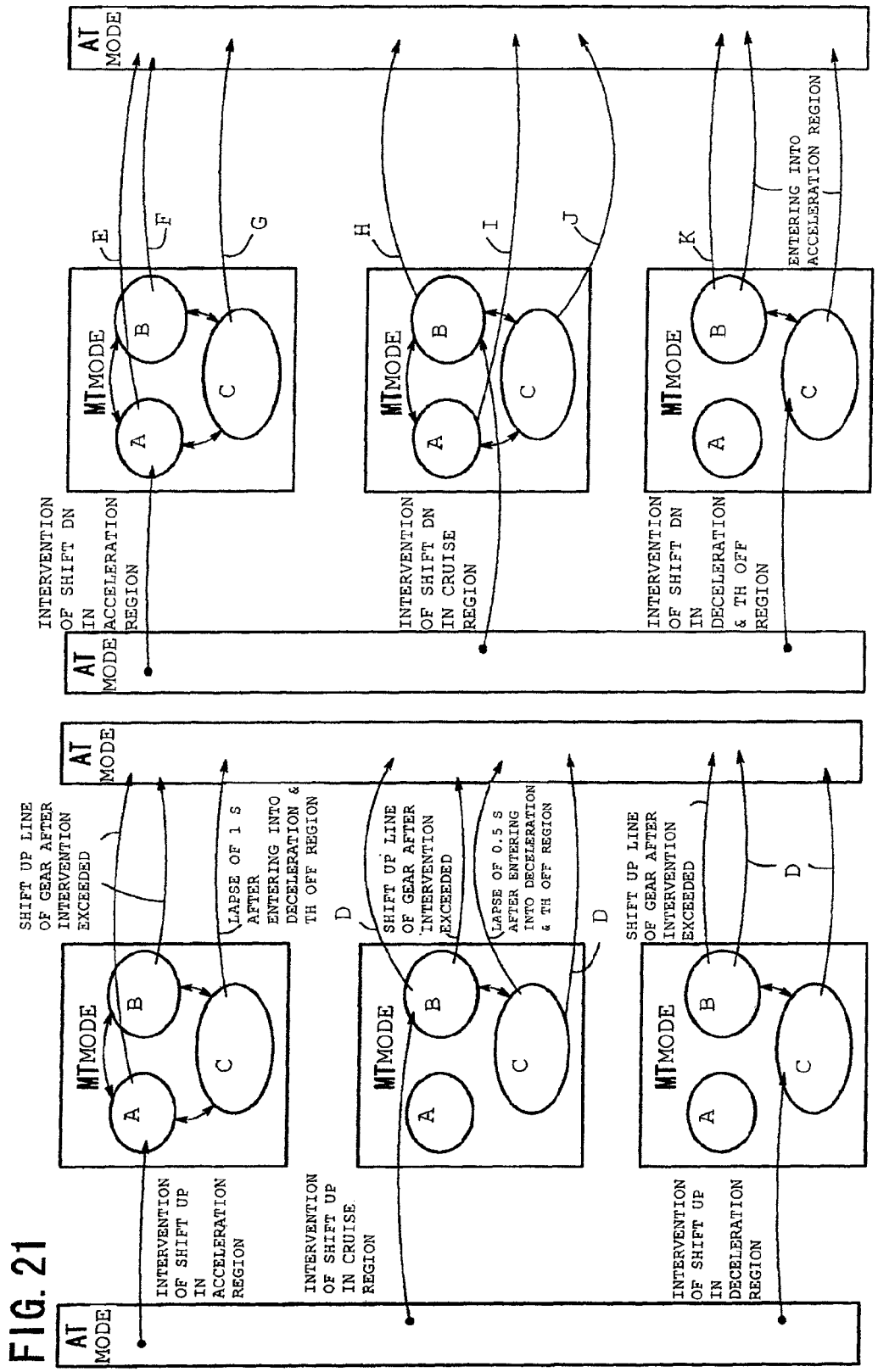
FIG. 21 is an operational mode transition diagram illustrating an example of a transition of an operational mode of a motorcycle.

First, the operation of automatic return to the automatic shift mode is described with reference to the flow charts of FIGS. 12 to 19 and the operational mode transition diagram of FIG. 21 illustrating an example of transition of the operational mode is described. When the motorcycle 12 is being driven in the automatic shift mode, the manual operation detection section 210 decides whether or not the shift up switch 102 is operated by the driver (step S1).

If it is decided at step S1 that the shift up switch 102 is operated (that a shift up operation is carried out), then the manual shift mode changeover section 212 changes over the shift mode from the automatic shift mode to the manual shift mode (step S2). After the shift mode is changed over to the manual shift mode, the automatic transmission controlling section 184 changes over the shift gear stage of the automatic transmission 168 in response to the operation of the shift up switch 102 or the shift down switch 104. Here, since the operation of the shift up switch 102 is detected and the shift mode has been changed over to the manual shift mode at step S1, the automatic transmission controlling section 184 controls the automatic transmission 168 to shift up the shift gear stage by one stage in response to the operation of the shift up switch 102 detected at step S1.

Then, the operational state discrimination section 214 discriminates the operational state of the motorcycle 12 upon the shift up operation (upon the manual operation for shift up) (step S3). The operational state discrimination section 214 uses the operational state discrimination map 232 to decide the operational state of the motorcycle 12 upon the shift up operation from the throttle opening and the vehicle speed upon the shift up operation. This throttle opening is detected by the throttle opening sensor 172, and the vehicle speed is detected by the vehicle speed sensor 178.

Then, the returning condition decision section 216 decides whether or not the operational state of the motorcycle 12 upon the shift up operation belongs to the acceleration operational region (step S4). In other words, the returning condition decision section 216 decides whether or not the throttle opening and the vehicle speed upon the shift up operation are included in the acceleration operational region. In particular, the returning condition decision section 216 decides whether or not the operational state of the motorcycle 12 decided at step S3 is an operational state in the acceleration operational region.

If it is decided at step S4 that the operational state of the motorcycle 12 upon the shift up operation is an operational state which belongs to the acceleration operational region, then the operational state discrimination section 214 uses the operational state discrimination map 232 to decide the operational state of the motorcycle 12 at present (step S5). In other words, the operational state discrimination section 214 decides the operational state of the motorcycle 12 at present from the throttle opening and the vehicle speed at present.

Then, the returning condition decision section 216 decides whether or not the operational state of the motorcycle 12 after the shift up operation is an operational state which belongs to the acceleration operational region (step S6). In other words, the returning condition decision section 216 decides whether or not the throttle opening and the vehicle speed at present are included in the acceleration operational region of the operational state discrimination map 232. In particular, the returning condition decision section 216 decides whether or not the operational state of the motorcycle 12 decided latest at step S5 is an operational state in the acceleration operational region.

If it is decided at step S6 that the operational state of the motorcycle 12 after the shift up operation is an operational state which belongs to the acceleration operational region, then the returning condition decision section 216 decides whether or not the operational state after the shift up operation is displaced once from the operational state in the acceleration operational region (step S7). In particular, if the operational state of the motorcycle 12 after the shift up operation decided in the preceding cycle does not belong to the acceleration operational region, then the returning condition decision section 216 decides that the operational state of the motorcycle 12 is displaced once from the operational state in the acceleration operational region.

If it is decided at step S7 that the operational state of the motorcycle 12 after the shift up operation is not displaced from the operational state in the acceleration operational region but is an operational state continuously belonging to the acceleration operational region, then the returning condition decision section 216 decides whether or not the vehicle speed and the throttle opening at present reach a vehicle speed and a throttle opening (shift timing) with which the automatic transmission 168 is to be shifted up based on the automatic shift map 230 (step S8).

As the automatic shift map 230 to be used in the decision at step S8, the automatic shift map 230 used in the automatic shift mode in the preceding operation cycle is used. For example, if the automatic shift mode in the preceding operation cycle is the automatic shift mode of the sport mode, then the sport mode shift map 242 is used, but if the automatic shift mode in the preceding operation cycle is the automatic shift mode of the drive mode, the drive mode shift map 240 is used. At this time, if the automatic shift mode in the preceding operation cycle is the automatic shift mode of the drive mode and is the default mode, then the default mode shift map 250 is used, but in the case of the quick mode, the quick mode shift map 252 is used.

If it is decided at step S8 that the vehicle speed and the throttle opening at present do not reach the vehicle speed and the throttle opening with which the automatic transmission 168 is to be shifted up based on the automatic shift map 230, then the processing returns to step S5.

On the other hand, if it is decided at step S7 that the operational state of the motorcycle 12 after the shift up operation is displaced once from the acceleration operational region, then the processing advances to step S9, at which the automatic shift mode returning section 218 automatically returns the shift mode to the automatic shift mode. After the shift mode returns to the automatic shift mode, the automatic transmission controlling section 184 changes over the shift gear stage of the automatic transmission 168 based on the automatic shift map 230.

In particular, if the operational state upon the shift up operation is an operational state in the acceleration operational region and, after another operational state which belongs to the cruise operational region or the deceleration operational region is entered after the shift up operation, a further operational state which belongs to the acceleration operational region is entered, then the returning condition decision section 216 decides that the automatic returning condition is satisfied. Thus, the automatic shift mode returning section 218 automatically returns the shift mode to the automatic shift mode.

If the operational state upon the shift up operation is an operational state in the acceleration operational region and, after the operational state of the motorcycle 12 is displaced once from an operational state in the acceleration operational region, an operational state in the acceleration operational region is entered, then since it is considered that the driver wants to carry out kick down, the shift mode is automatically returned to the automatic shift mode. Consequently, the automatic transmission controlling section 184 is permitted to execute kick down based on the automatic shift map 230 and can immediately satisfy an acceleration request of the driver.

On the other hand, if it is decided at step S8 that the vehicle speed and the throttle opening at present reach the vehicle speed and the throttle opening with which the automatic transmission 168 is to be shifted up based on the automatic shift map 230, then the processing returns to step S9, at which the automatic shift mode returning section 218 automatically returns the shift mode to the automatic shift mode. Since the vehicle speed and the throttle opening reach the vehicle speed and the throttle opening with which the automatic transmission 168 is to be shifted up based on the automatic shift map 230, after the shift mode returns to the automatic shift mode, the automatic transmission controlling section 184 controls the automatic transmission 168 to shift up the shift gear stage.

In particular, if the operational state of the motorcycle 12 upon the shift up operation is an operational state in the acceleration operational region and, while the operational state in the acceleration region continues also after the shift up operation, the vehicle speed and the throttle opening at present reach the vehicle speed and the throttle opening with which the automatic transmission 168 is to be shifted up based on the automatic shift map 230, then the returning condition decision section 216 decides that the automatic returning condition is satisfied. Thus, the automatic shift mode returning section 218 automatically returns the shift mode to the automatic shift mode.

If the operational state of the motorcycle 12 upon the shift up operation is an operational state in the acceleration operational region and the operational state in the acceleration operational region continues after the shift up operation, it is considered that a driver wants to accelerate moderately, so that the shift mode does not return to the automatic shift mode until the vehicle speed and the throttle opening at present become equal to the vehicle speed and the throttle opening with which shift up is to be carried out. Therefore, kick down is not executed, and while moderate acceleration is implemented, the automatic shift mode can be returned.

Figure 13:
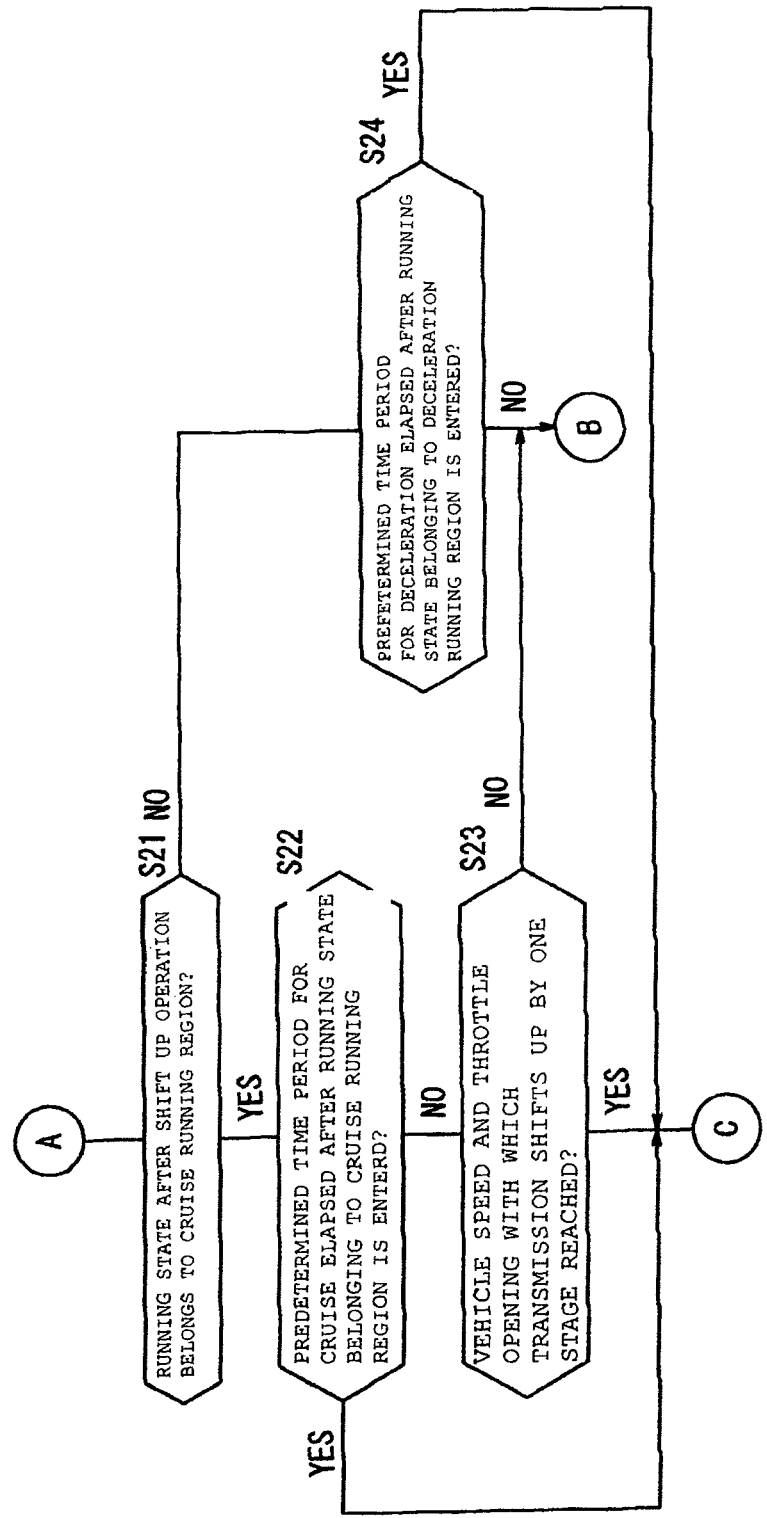
FIG. 13 is a flow chart illustrating operation of automatic returning from the manual shift mode to the automatic shift mode.

If it is decided at step S6 that the operational state of the motorcycle 12 after the shift up operation is not an operational state which belongs to the acceleration operational region, then the processing advances to step S21 of FIG. 13, at which the returning condition decision section 216 decides whether or not the operational state of the motorcycle 12 after the shift up operation is an operational state which belongs to the cruise operational region. In other words, it is decided at step S5 whether or not the operational state of the motorcycle 12 discriminated latest is an operational state in the cruise operational region.

If it is decided at step S21 that the operational state of the motorcycle 12 after the shift up operation is an operational state which belongs to the cruise operational region, then the returning condition decision section 216 decides whether or not a predetermined period of time for cruise (fourth predetermined time period) elapses after the operational state belonging to the cruise operational region is entered (step S22). It is to be noted that the predetermined time period for cruise is stored in the storage section 124.

If it is decided at step S22 that the predetermined time period for cruise does not elapse after the operational state belonging to the cruise operational region is entered, then the returning condition decision section 216 decides whether or not the vehicle speed and the throttle opening at present reach the vehicle speed and the throttle opening with which the automatic transmission 168 is to be shifted up based on the automatic shift map 230 (step S23). As the automatic shift map 230 to be used in the decision at step S23, the automatic shift map 230 used in the automatic shift mode in the preceding operation cycle is used.

Figure 12:
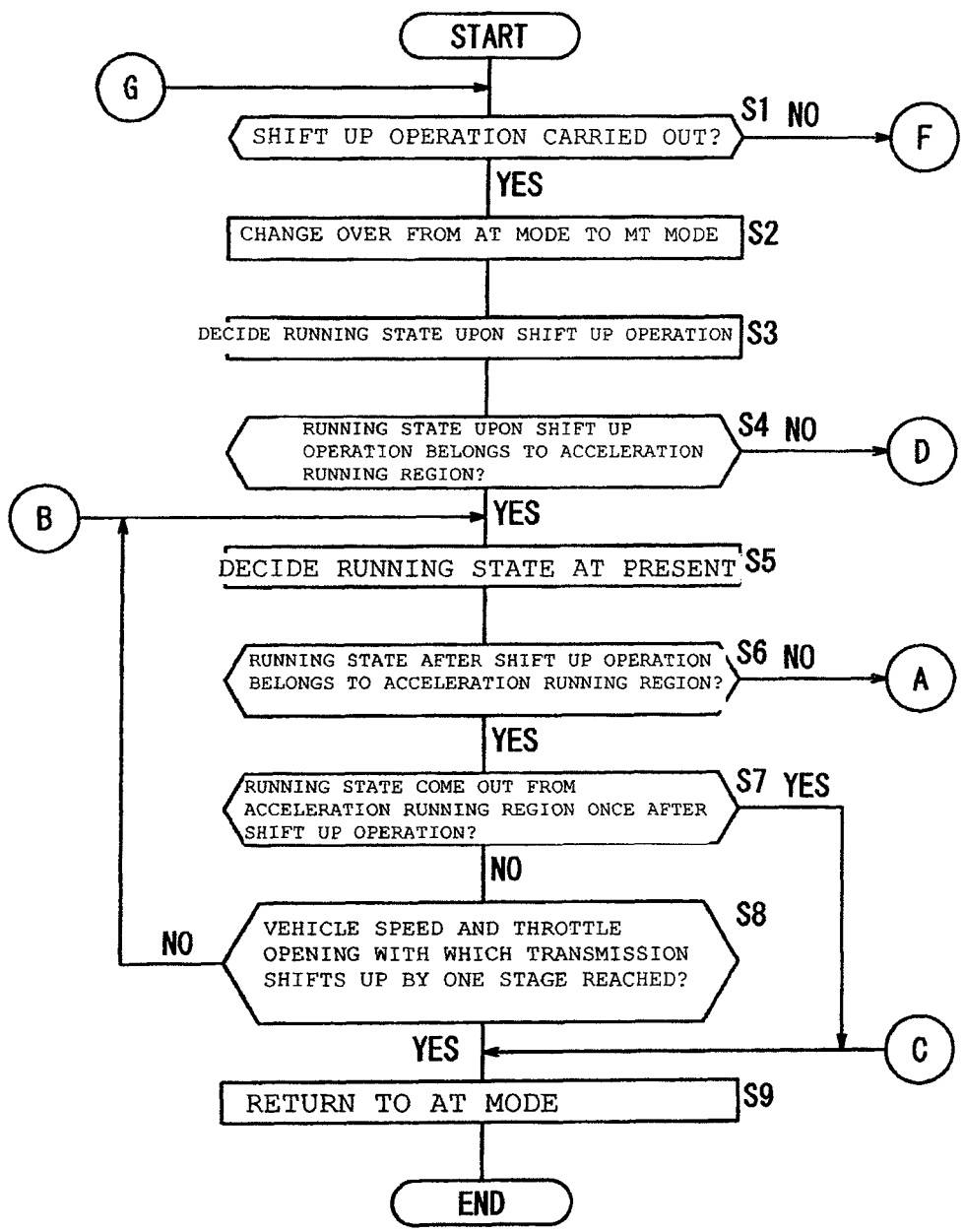
FIG. 12 is a flow chart illustrating operation of automatic returning from the manual shift mode to the automatic shift mode.

If it is decided at step S23 that the vehicle speed and the throttle opening at present do not reach the vehicle speed and the throttle opening with which the automatic transmission 168 is to be shifted up based on the automatic shift map 230, then the processing returns to step S5 of FIG. 12.

On the other hand, if it is decided at step S22 that the predetermined time period for cruise elapses after the operational state belonging to the cruise operational region is entered, then the processing advances to step S9 of FIG. 12, at which the automatic shift mode returning section 218 automatically returns the shift mode to the automatic shift mode. After the shift mode is returned to the automatic shift mode, the automatic transmission controlling section 184 changes over the shift gear stage of the automatic transmission 168 based on the automatic shift map 230. In particular, if the operational state of the motorcycle 12 upon the shift up operation is an operational state in the acceleration operational region and the operational state of the motorcycle 12 after the shift up operation remains the operational state in the cruise operational region continuously for the predetermined time period for cruise, then the returning condition decision section 216 decides that the automatic returning condition is satisfied. Thus, the automatic shift mode returning section 218 automatically returns the shift mode to the automatic shift mode.

On the other hand, if it is decided at step S23 that the vehicle speed and the throttle opening at present reach the vehicle speed and the throttle opening with which the automatic transmission 168 is to be shifted up based on the automatic shift map 230, then the processing advances to step S9 of FIG. 12, at which the automatic shift mode returning section 218 automatically returns the shift mode to the automatic shift mode. Here, since the vehicle speed and the throttle opening reach the vehicle speed and the throttle opening with which the automatic transmission 168 is to be shifted up based on the automatic shift map 230, when the shift mode is automatically returned to the automatic shift mode, the automatic transmission controlling section 184 shifts up the shift gear stage of the automatic transmission 168.

In particular, if the operational state of the motorcycle 12 upon the shift up operation is an operational state in the acceleration operational region and the operational state of the motorcycle 12 after the shift up operation is an operational state in the cruise operational region and besides the vehicle speed and the throttle opening at present reach the vehicle speed and the throttle opening with which the automatic transmission 168 is to be shifted up based on the automatic shift map 230, then the returning condition decision section 216 decides that the automatic returning condition is satisfied. Thus, the automatic shift mode returning section 218 automatically returns the shift mode to the automatic shift mode.

If the operational state of the motorcycle 12 upon the shift up operation is an operational state in the acceleration operational region and then enters an operational state in the cruise operational region, then it is considered that the driver wants to carry out cruise operation with the shift gear stage after the shift up operation. Therefore, until the operational state in the cruise operational region continues for the predetermined time period for cruise or until the vehicle speed and the throttle opening reach the vehicle speed and the throttle opening with which the automatic transmission 168 is to be shifted up, the shift mode is not returned to the automatic shift mode. Therefore, a cruise operation can be carried out with the shift gear stage after the shift up operation. Further, the shift gear stage of the automatic transmission 168 does not change over frequently, and an unfamiliar feeling by frequent speed change is not provided to the driver.

On the other hand, if it is decided that the operational state of the motorcycle 12 after the shift up operation is not an operational state belonging to the cruise operational region, that is, when the operational state of the motorcycle 12 after the shift up operation is an operational state belonging to the deceleration operational region, the returning condition decision section 216 decides whether or not a predetermined time period for deceleration (second predetermined time period) elapses after an operational state belonging to the deceleration operational region is entered (step S24). It is to be noted that the predetermined time period for deceleration is stored in the storage section 124.

If it is decided at step S24 that the predetermined time period for deceleration does not elapse after the operational state belonging to the deceleration operational region is entered, then the processing returns to step S5 of FIG. 12. However, if it is decided at step S24 that the predetermined time period for deceleration elapses after the operational state belonging to the deceleration operational region is entered, then the processing advances to step S9 of FIG. 12, at which the automatic shift mode returning section 218 automatically returns the shift mode to the automatic shift mode. After the shift mode is returned to the automatic shift mode, the automatic transmission controlling section 184 changes over the shift gear stage of the automatic transmission 168 based on the automatic shift map 230.

More particularly, if the operational state of the motorcycle 12 upon the shift up operation is an operational state in the acceleration operational region and the operational state of the motorcycle 12 after the shift up operation is the operational state in the deceleration operational region continuously for the predetermined time period for deceleration, then the returning condition decision section 216 decides that the automatic returning condition is satisfied. Thus, the automatic shift mode returning section 218 automatically returns the shift mode to the automatic shift mode.

If the operational state of the motorcycle 12 upon the shift up operation is in an operational state in the acceleration operational region and thereafter enters an operational state in the deceleration operational region, then it is considered that the driver wants to carry out deceleration with the shift gear stage after the shift up operation. Therefore, since the shift mode does not return to the automatic shift mode until the operational state in the deceleration operational state continues for the predetermined time period for deceleration, the motorcycle 12 can operate while being decelerated with the shift gear stage after the shift up operation. Further, the shift gear stage of the automatic transmission 168 does not frequently change over, and an unfamiliar feeling by frequent speed change is not provided to the driver.

Figure 14:
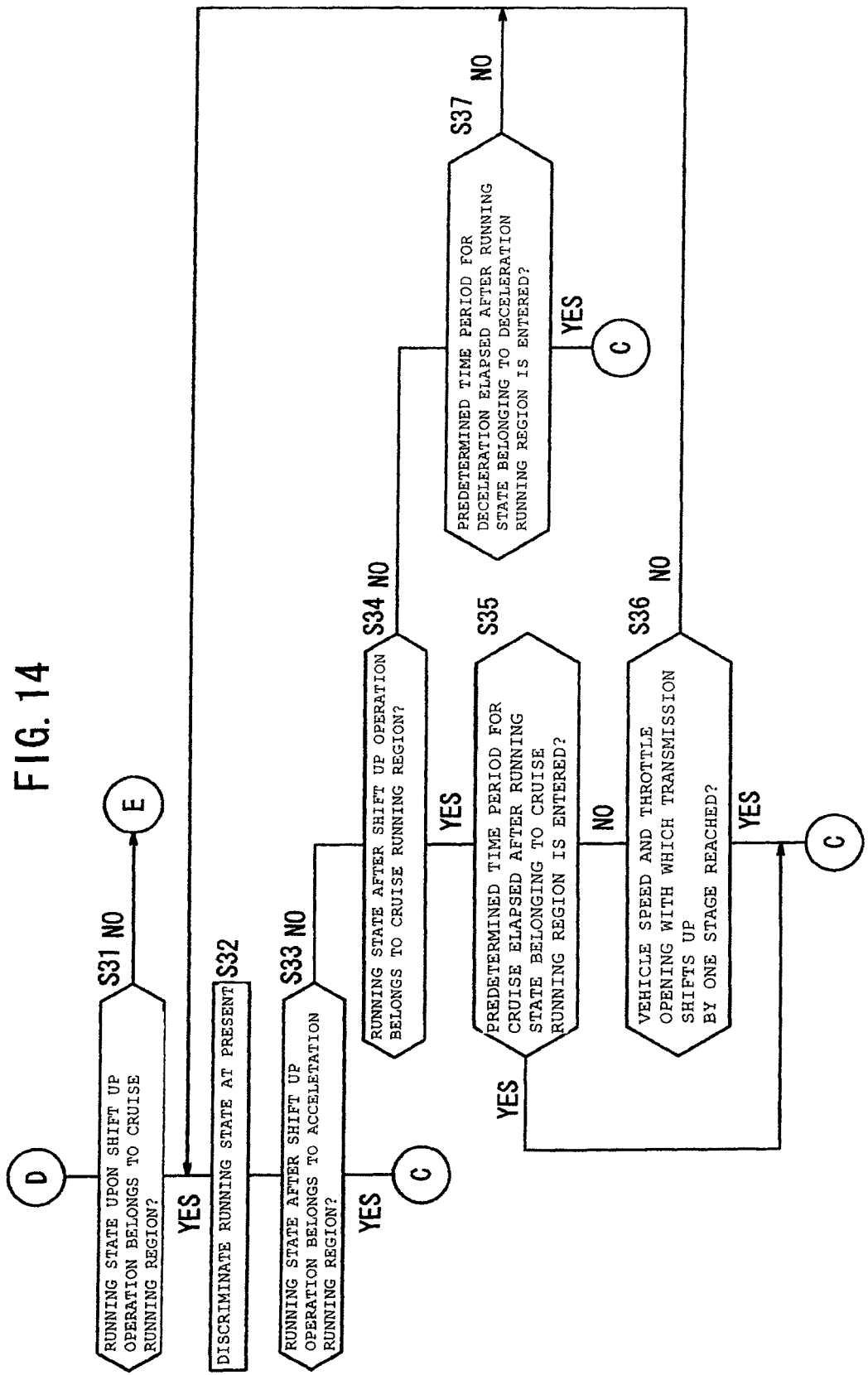
FIG. 14 is a flow chart illustrating operation of automatic returning from the manual shift mode to the automatic shift mode.

If it is decided at step S4 of FIG. 12 that the operational state of the motorcycle 12 upon the shift up operation is not an operational state belonging to the acceleration operational region, then the processing advances to step S31 of FIG. 14, at which the returning condition decision section 216 decides whether or not the operational state of the motorcycle 12 upon the shift up operation is an operational state belonging to the cruise operational region. In short, it is decided whether or not the operational state decided latest at step S3 is an operational state in the cruise operational region.

If it is decided at step S31 that the operational state of the motorcycle 12 upon the shift up operation is an operational state belonging to the cruise operational region, then the operational state discrimination section 214 decides the operational state at present using the automatic shift map 230 (step S32). In particular, the operational state discrimination section 214 decides the operational state of the motorcycle 12 at present from the throttle opening and the vehicle speed at present.

Then, the returning condition decision section 216 decides whether or not the operational state of the motorcycle 12 after the shift up operation is an operational state belonging to the acceleration operational region (step S33). In particular, the returning condition decision section 216 decides whether or not the throttle opening and the vehicle speed at present are included in the acceleration operational region of the operational state discrimination map 232. In other words, the returning condition decision section 216 decides whether or not the operational state of the motorcycle 12 decided latest at step S32 is an operational state in the acceleration operational region.

If it is decided at step S33 that the operational state of the motorcycle 12 after the shift up operation is an operational state belonging to the acceleration operational region, then the processing advances to step S9 of FIG. 12, at which the automatic shift mode returning section 218 automatically returns the shift mode to the automatic shift mode. After the shift mode is returned to the automatic shift mode, the automatic transmission controlling section 184 changes over the shift gear stage of the automatic transmission 168 based on the automatic shift map 230.

In particular, if the operational state of the motorcycle 12 upon the shift up operation is an operational state in the cruise operational region and an operational state in the acceleration operational region is entered after the shift up operation, then the returning condition decision section 216 decides that the automatic returning condition is satisfied. Thus, the automatic shift mode returning section 218 automatically returns the shift mode to the automatic shift mode.

If the operational state of the motorcycle 12 upon the shift up operation is an operational state in the cruise operational region and then an operational state in the acceleration operational region is entered after the shift up operation, then it is considered that the driver wants to carry out kick down. Therefore, the shift mode is automatically returned to the automatic shift mode. Consequently, the automatic transmission controlling section 184 is permitted to execute kick down based on the automatic shift map 230, and it is possible to immediately satisfy a strong acceleration request of the driver.

On the other hand, if it is decided at step S33 that the operational state of the motorcycle 12 after the shift up operation is not an operational state belonging to the acceleration operational region, then the returning condition decision section 216 decides whether or not the operational state of the motorcycle 12 after the shift up operation is an operational state belonging to the cruise operational region (step S34). In other words, the returning condition decision section 216 decides whether or not the operational state of the motorcycle 12 decided latest at step S32 is an operational state in the cruise operational region.

If it is decided at step S34 that the operational state of the motorcycle 12 after the shift up operation is an operational state belonging to the cruise operational region, then the returning condition decision section 216 decides whether or not the predetermined time period for cruise (fourth predetermined time period) elapses after an operational state belonging to the cruise operational region is entered after the shift up operation (step S35).

If it is decided at step S35 that the predetermined time period for cruise does not elapse after an operational state belonging to the cruise operational region is entered after the shift up operation, then the returning condition decision section 216 decides whether or not the vehicle speed and the throttle opening (shift timing) with which the automatic transmission 168 is to be shifted up based on the automatic shift map 230 are reached (step S36) at present. As the automatic shift map 230 to be used in the decision at step S36, the automatic shift map 230 used in the preceding automatic shift mode is used.

If it is decided at step S36 that the vehicle speed and the throttle opening at present do not reach the vehicle speed and the throttle opening with which the automatic transmission 168 is to be shifted up based on the automatic shift map 230, then the processing returns to step S32.

On the other hand, if it is decided at step S35 that the predetermined time period for cruise elapses after the operational state belonging to the cruise operational region is entered after the shift up operation, then the processing advances to step S9 of FIG. 12, at which the automatic shift mode returning section 218 automatically returns the shift mode to the automatic shift mode. After the shift mode is returned to the automatic shift mode, the automatic transmission controlling section 184 changes over the shift gear state of the automatic transmission 168 based on the automatic shift map 230.

In particular, if the operational state of the motorcycle 12 upon the shift up operation is an operational state in the cruise operational region and the operational state of the motorcycle 12 after the shift up operation is the operational state in the cruise operational region continuously for the predetermined time period for cruise, then the returning condition decision section 216 decides that the automatic returning condition is satisfied. Thus, the automatic shift mode returning section 218 automatically returns the shift mode to the automatic shift mode.

On the other hand, if it is decided at step S36 that the vehicle speed and the throttle opening at present reach the vehicle speed and the throttle opening with which the automatic transmission 168 is to be shifted up based on the automatic shift map 230, then the processing advances to step S9 of FIG. 12, at which the automatic shift mode returning section 218 automatically returns the shift mode to the automatic shift mode. Here, since the vehicle speed and the throttle opening reach the vehicle speed and the throttle opening with which the automatic transmission 168 is to be shifted up based on the automatic shift map 230, after the shift mode automatically returns the automatic shift mode, the automatic transmission controlling section 184 controls the automatic transmission 168 to shift up the shift gear stage.

In particular, if the operational state of the motorcycle 12 upon the shift up operation is an operational state in the cruise operational region and the operational state of the motorcycle 12 after the shift up operation is the operational state in the cruise operational region. In addition, the vehicle speed and the throttle opening at present reach the vehicle speed and the throttle opening with which the automatic transmission 168 is to be shifted up based on the automatic shift map 230, then the returning condition decision section 216 decides that the automatic returning condition is satisfied. Thus, the automatic shift mode returning section 218 automatically returns the shift mode to the automatic shift mode.

If the operational state of the motorcycle 12 upon the shift up operation is an operational state in the cruise operational region and the operational state of the motorcycle 12 after the shift up operation is the operational state in the cruise operational region, then it is considered that the driver wants to carry out cruise operation with the shift gear stage after the shift up operation. Therefore, until the operational state in the cruise operational region continues for the predetermined time period for cruise or until the vehicle speed and the throttle opening at present become the vehicle speed and the throttle opening with which the automatic transmission 168 is to be shifted up, the shift mode does not automatically return to the automatic shift mode. Therefore, the motorcycle 12 can carry out cruise operation with the shift gear stage after the shift up operation. Further, the shift gear stage of the automatic transmission 168 does not change over frequently, and an unfamiliar feeling by frequent speed change is not provided to the driver.

If it is decided at step S34 that the operational state of the motorcycle 12 after the shift up operation is not an operational state belonging to the cruise operational region, that is, if it is decided that the operational state of the motorcycle 12 after the shift up operation belongs to the deceleration operational region, then the returning condition decision section 216 decides whether or not the predetermined time period for deceleration (second predetermined time period) elapses after the operational state belonging to the deceleration operational region is entered (step S37).

If it is decided at step S37 that the predetermined time period for deceleration does not elapse after the operational state belonging to the deceleration operational region is entered, then the processing returns to step S32. However, if it is decided at step S37 that the predetermined time period for deceleration elapses after the operational state belonging to the deceleration operational region is entered, then the processing advances to step S9 of FIG. 12, at which the automatic shift mode returning section 218 automatically returns the shift mode to the automatic shift mode. After the shift mode is returned to the automatic shift mode, the automatic transmission controlling section 184 changes over the shift gear stage of the automatic transmission 168 based on the automatic shift map 230.

In particular, if the operational state of the motorcycle 12 upon the shift up operation is an operational state in the cruise operational region and the operational state of the motorcycle 12 after the shift up operation is an operational state in the deceleration operational region continuously for the predetermined time period for deceleration, then the returning condition decision section 216 decides that the automatic returning condition is satisfied. Thus, the automatic shift mode returning section 218 automatically returns the shift mode to the automatic shift mode.

If the operational state of the motorcycle 12 upon the shift up operation is an operational state in the cruise operational region and then an operational state in the deceleration operational region is entered, then it is considered that the driver wants to carry out the deceleration operation with the shift gear stage after the shift up operation. Therefore, until the operational state of the deceleration operational region continues for the predetermined time period for deceleration, the shift mode does not automatically return to the automatic shift mode, and therefore, the motorcycle 12 can operate while decelerating with the shift gear stage after the shift up operation. Further, the shift gear stage of the automatic transmission 168 does not change over frequently, and an unfamiliar feeling by frequent speed change is not provided to the driver.

Figure 15:
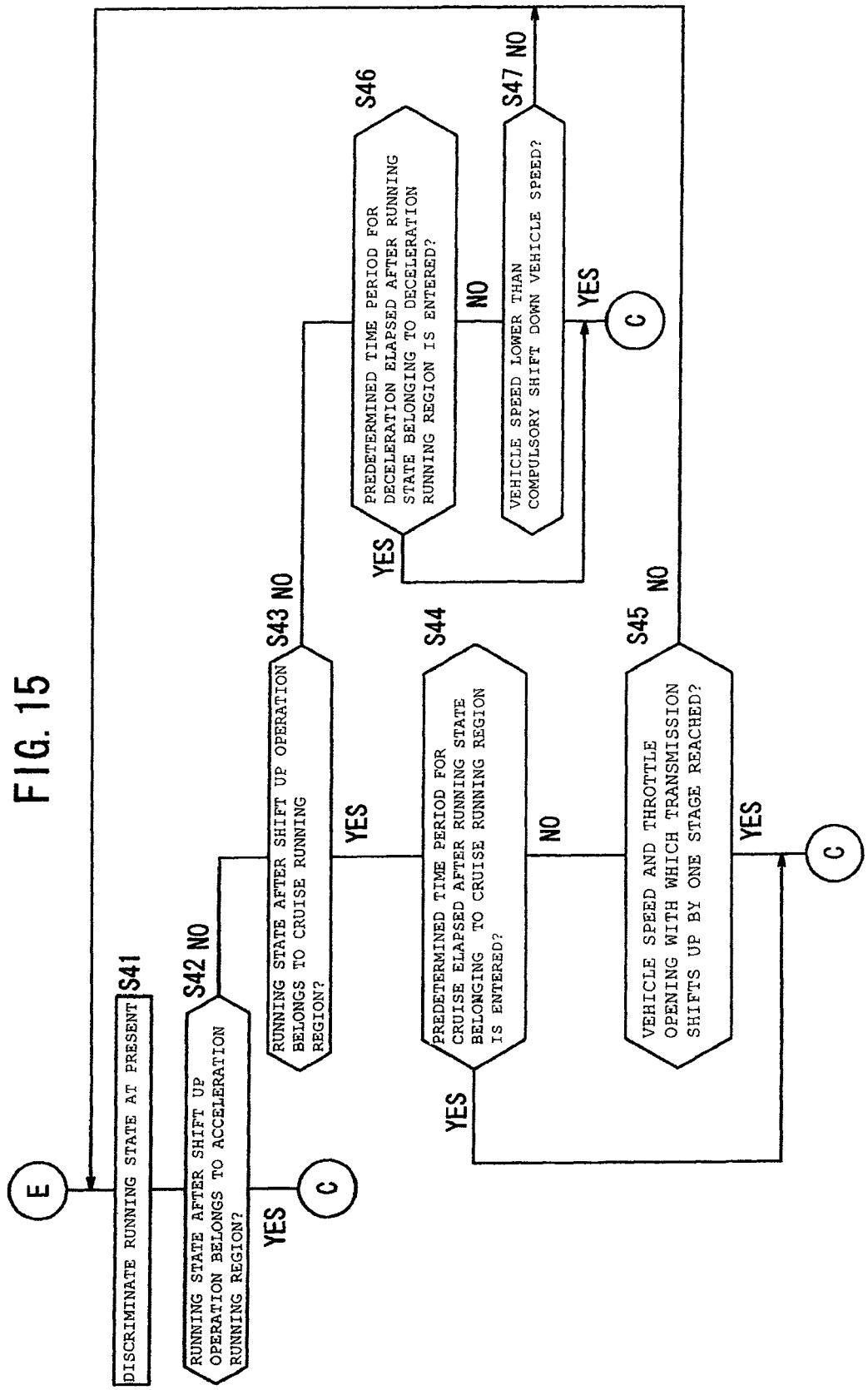
FIG. 15 is a flow chart illustrating operation of automatic returning from the manual shift mode to the automatic shift mode.

On the other hand, if it is decided at step S31 that the operational state of the motorcycle 12 upon the shift up operation is not an operational state belonging to the cruise operational region, that is, if the operational state of the motorcycle 12 upon the shift up operation is an operational state belonging to the deceleration operational region, then the processing advances to step S41 of FIG. 15, at which the operational state discrimination section 214 decides the operational state of the motorcycle 12 at present using the operational state discrimination map 232. In other words, the operational state discrimination section 214 decides the operational state of the motorcycle 12 at present from the vehicle speed and the throttle opening at present.

Then, the returning condition decision section 216 decides whether or not the operational state of the motorcycle 12 after the shift up operation is an operational state belonging to the acceleration operational region (step S42). In other words, the returning condition decision section 216 decides whether or not the operational state of the motorcycle 12 decided latest at step S42 is an operational state in the acceleration operational region.

If it is decided at step S42 that the operational state of the motorcycle 12 after the shift up operation is an operational state belonging to the acceleration operational region, then the processing advances to step S9 of FIG. 12, at which the automatic shift mode returning section 218 automatically returns the shift mode to the automatic shift mode. After the shift mode is returned to the automatic shift mode, the automatic transmission controlling section 184 changes over the shift gear stage of the automatic transmission 168 based on the automatic shift map 230.

In particular, if the operational state of the motorcycle 12 upon the shift up operation is an operational state in the deceleration operational region and the operational state of the motorcycle 12 after the shift up operation is an operational state in the acceleration operational region, then the returning condition decision section 216 decides that the automatic returning condition is satisfied. Thus, the automatic shift mode returning section 218 automatically returns the shift mode to the automatic shift mode.

If the operational state of the motorcycle 12 upon the shift up operation is an operational state in the deceleration operational region and an operational state in the acceleration operational region is entered after the shift up operation, then it is considered that the driver wants to carry out kick down. Therefore, the shift mode is automatically returned to the automatic shift mode. Consequently, the automatic transmission controlling section 184 is permitted to execute kick down based on the automatic shift map 230, and it is possible to satisfy a strong acceleration request of the driver.

If it is decided at step S42 that the operational state of the motorcycle 12 after the shift up operation is not an operational state belonging to the acceleration operational region, then the returning condition decision section 216 decides whether or not the operational state of the motorcycle 12 after the shift up operation is an operational state belonging to the cruise operational region (step S43). In other words, the returning condition decision section 216 decides whether or not the operational state of the motorcycle 12 decided latest at step S41 is an operational state in the cruise operational region.

If it is decided at step S43 that the operational state of the motorcycle 12 after the shift up operation is an operational state belonging to the cruise operational region, then the returning condition decision section 216 decides whether or not the predetermined time period for cruise (fourth predetermined time period) elapses after the operational state belonging cruise operational region is entered (step S44).

If it is decided at step S44 that the predetermined time period for cruise does not elapse after the operational state belonging to the cruise operational region is entered, then the returning condition decision section 216 decides whether or not the vehicle speed and the throttle opening at present reach the vehicle speed and the throttle opening with which the automatic transmission 168 is to be shifted up based on the automatic shift map 230 (step S45). As the automatic shift map 230 to be used in the decision at step S45, the automatic shift map 230 used in the automatic shift mode in the preceding operation cycle is used.

If it is decided at step S45 that the vehicle speed and the throttle opening at present do not reach the vehicle speed and the throttle opening with which the automatic transmission 168 is to be shifted up based on the automatic shift map 230, then the processing returns to step S41.

On the other hand, if it is decided at step S44 that the predetermined time period for cruise elapses after the operational state belongs to the cruise operational region is entered, then the processing advances to step S9 of FIG. 12, at which the automatic shift mode returning section 218 automatically returns the shift mode to the automatic shift mode. After the shift mode is returned to the automatic shift mode, the automatic transmission controlling section 184 changes over the shift gear stage of the automatic transmission 168 based on the automatic shift map 230.

In particular, if the operational state of the motorcycle 12 upon the shift up operation is an operational state in the deceleration operational region and the operational state of the motorcycle 12 after the shift up operation is an operational state in the cruise operational region continuously for the predetermined time period for cruise, then the returning condition decision section 216 decides that the automatic returning condition is satisfied. Thus, the automatic shift mode returning section 218 automatically returns the shift mode to the automatic shift mode.

On the other hand, if it is decided at step S45 that the vehicle speed and the throttle opening at present reach the vehicle speed and the throttle opening with which the automatic transmission 168 is to be shifted up based on the automatic shift map 230, then the processing advances to step S9 of FIG. 12, at which the automatic shift mode returning section 218 automatically returns the shift mode to the automatic shift mode. Here, since the vehicle speed and the throttle opening already reach the vehicle speed and the throttle opening with which the automatic transmission 168 is to be shifted up based on the automatic shift map 230, when the shift mode automatically returns to the automatic shift mode, the automatic transmission controlling section 184 controls the automatic transmission 168 to shift up the shift gear stage.

In particular, if the operational state of the motorcycle 12 upon the shift up operation is an operational state in the deceleration operational region and the operational state of the motorcycle 12 after the shift up operation is the operational state in the cruise operational region. In addition, the vehicle speed and the throttle opening at present reach the vehicle speed and the throttle opening with which the automatic transmission 168 is to be shifted up based on the automatic shift map 230, then the returning condition decision section 216 decides that the automatic returning condition is satisfied. Thus, the automatic shift mode returning section 218 automatically returns the shift mode to the automatic shift mode.

If the operational state of the motorcycle 12 upon the shift up operation is an operational state in the deceleration operational region and then the operational state of the motorcycle 12 after the shift up operation is an operational state in the cruise operational region, then it is considered that the driver wants to carry out cruise operation with the shift gear stage after the shift up operation. Therefore, until the operational state of the cruise operational region continues for the predetermined time period for cruise or until the vehicle speed and the throttle opening at present reach the vehicle speed and the throttle opening with which the automatic transmission 168 is to be shifted up, the shift mode does not automatically return to the automatic shift mode, and therefore, cruise operation can be carried out with the shift gear stage after the shift up operation. Further, the shift gear stage of the automatic transmission 168 does not change over frequently, and an unfamiliar feeling by frequent speed change is not provided to the driver.

If it is decided at step S43 that the operational state of the motorcycle 12 after the shift up operation is not an operational state belonging to the cruise operational region, that is, if the operational state of the motorcycle 12 after the shift up operation is an operational state belonging to the deceleration operational region, then the returning condition decision section 216 decides whether or not the predetermined time period for deceleration (second predetermined time period) elapses after the operational state belonging to the deceleration operational region is entered after the shift up operation (step S46).

If it is decided at step S46 that the predetermined time period for deceleration does not elapse after the operational state belonging to the deceleration operational region is entered after the shift up operation, then the returning condition decision section 216 decides whether or not the vehicle speed at present is lower than a compulsory shift down vehicle speed (step S47). If it is decided at step S47 that the vehicle speed at present is not lower than the compulsory shift down vehicle speed, then the processing returns to step S41.

If it is decided at step S46 that the predetermined time period for deceleration elapses after the operational state belonging to the deceleration operational region is entered, then the processing advances to step S9 of FIG. 12, at which the automatic shift mode returning section 218 automatically returns the shift mode to the automatic shift mode. After the shift mode is returned to the automatic shift mode, the automatic transmission controlling section 184 controls the automatic transmission 168 to change over the shift gear stage based on the automatic shift map 230.

More particularly, if the operational state of the motorcycle 12 upon the shift up operation is an operational state in the deceleration operational region and the operational state of the motorcycle 12 after the shift up operation is the operational state in the deceleration operational region continuously for the predetermined time period for deceleration, then the returning condition decision section 216 decides that the automatic returning condition is satisfied. Thus, the automatic shift mode returning section 218 automatically returns the shift mode to the automatic shift mode.

If the operational state of the motorcycle 12 upon the shift up operation is an operational state in the deceleration operational region and the operational state of the motorcycle 12 after the shift up operation is the operational state in the deceleration operational region, then it is considered that the driver wants to carry out deceleration operational with the shift gear stage after the shift up operation. Therefore, until the operational state of the deceleration operational region continues for the predetermined time period for deceleration, the shift mode does not automatically return to the automatic shift mode, and therefore, the motorcycle 12 can operate while decelerating with the shift gear stage after the shift up operation. Further, the shift gear stage of the automatic transmission 168 does not change over frequently, and an unfamiliar feeling by frequent speed change is not provided to the driver.

On the other hand, if it is decided at step S47 that the vehicle speed at present is lower than the compulsory shift down vehicle speed, then the processing advances to step S9 of FIG. 12, at which the automatic shift mode returning section 218 automatically returns the shift mode to the automatic shift mode. After the shift mode is returned to the automatic shift mode, the automatic transmission controlling section 184 changes over the shift gear stage of the automatic transmission 168 based on the automatic shift map 230. In particular, if the operational state of the motorcycle 12 upon the shift up operation is an operational state in the deceleration operational region and the operational state of the motorcycle 12 after the shift up operation is the operational state in the deceleration operational region and besides the vehicle speed is lower than a compulsory shift down vehicle speed, then the returning condition decision section 216 decides that the automatic returning condition is satisfied. Thus, the automatic shift mode returning section 218 automatically returns the shift mode to the automatic shift mode.

Figure 16:
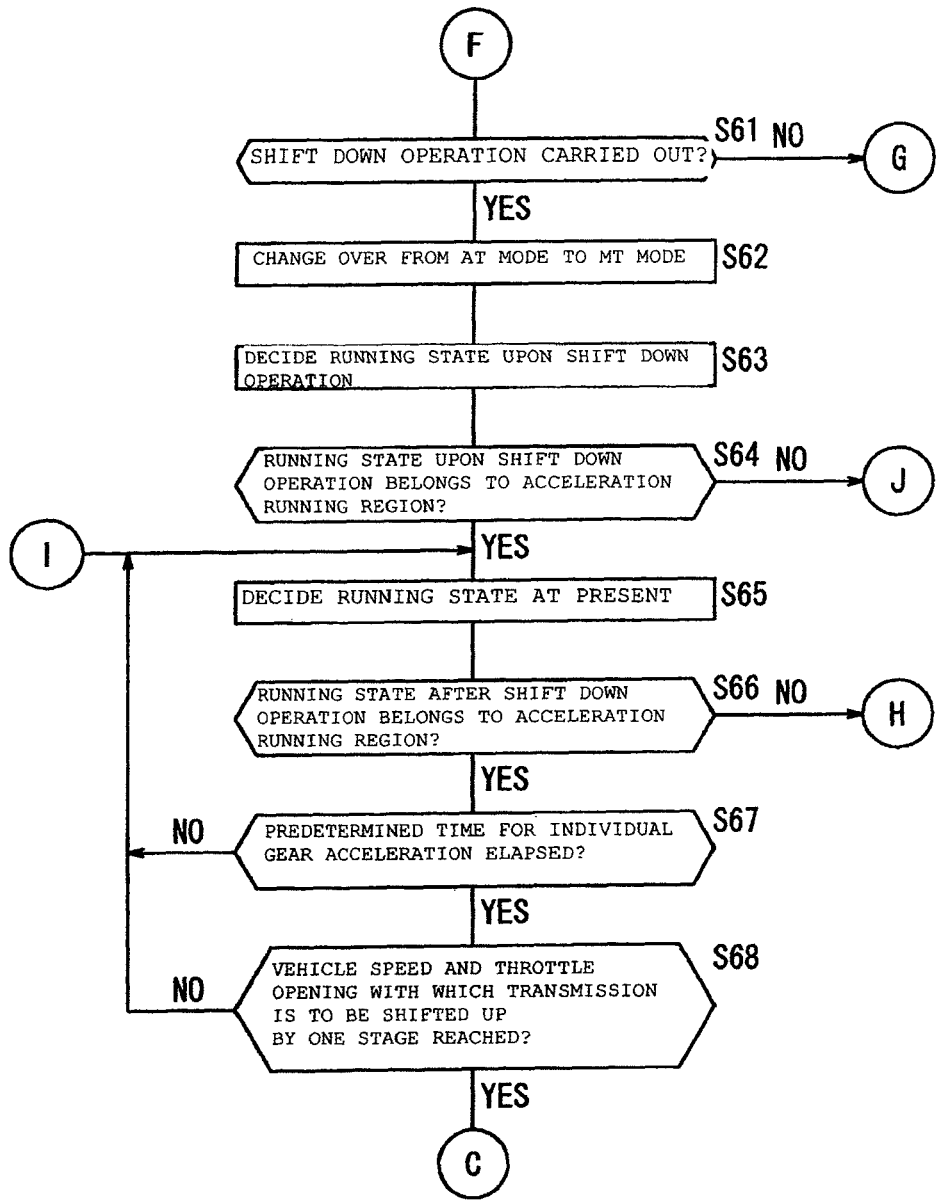
FIG. 16 is a flow chart illustrating operation of automatic returning from the manual shift mode to the automatic shift mode.
Figure 17:
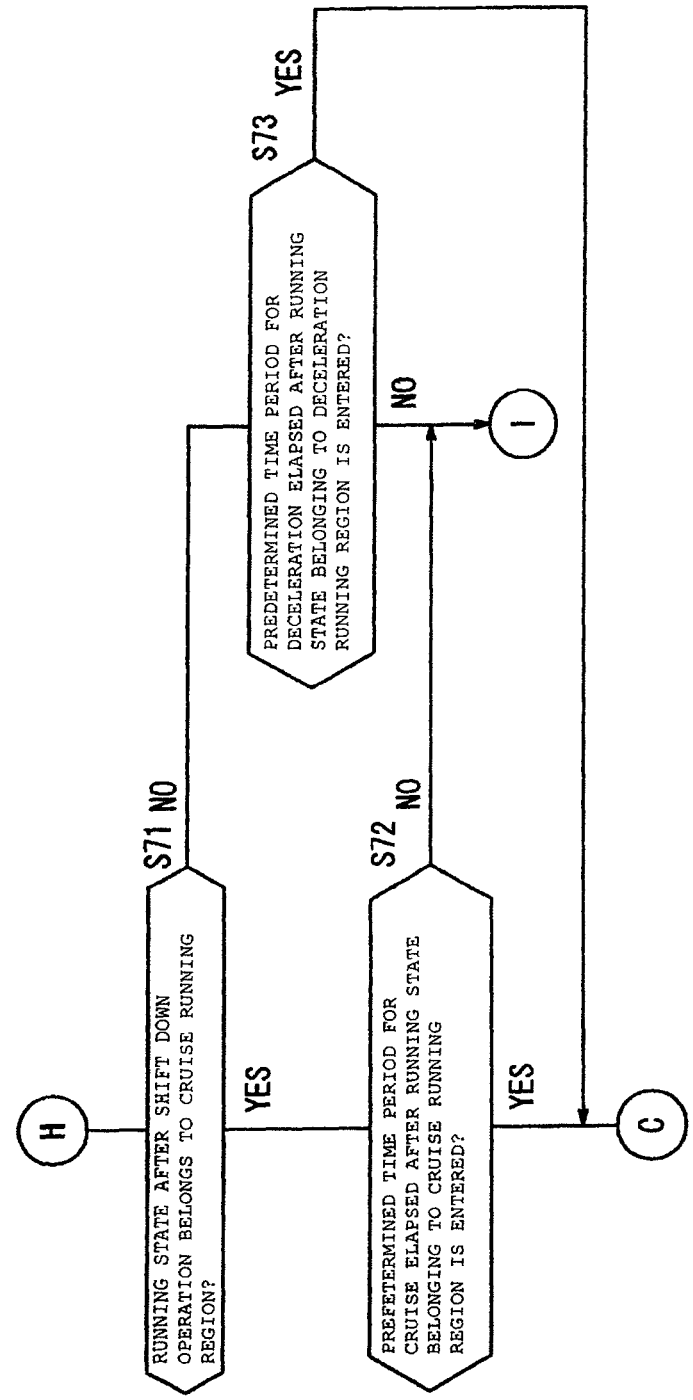
FIG. 17 is a flow chart illustrating operation of automatic returning from the manual shift mode to the automatic shift mode.

If it is decided at step S1 of FIG. 12 that, when the motorcycle 12 is operational in the automatic shift mode, the shift up switch 102 is not operated by the driver, then the processing advances to step S61 of FIG. 16, at which the manual operation detection section 210 discriminates whether or not the shift down switch 104 is operated by the driver.

If it is decided at step S61 that the shift down switch 104 is not operated, then the processing returns to step S1 of FIG. 12, but if it is decided that the shift down switch 104 is operated (a shift down operation is carried out), then the manual shift mode changeover section 212 changes over the shift mode from the automatic shift mode to the manual shift mode (step S62). After the shift mode is changed over to the manual shift mode, the automatic transmission controlling section 184 changes over the shift gear stage of the automatic transmission 168 in response to an operation of the shift up switch 102 or the shift down switch 104. Here, since an operation of the shift down switch 104 is detected at step S61 and the shift mode is changed over to the manual shift mode, the automatic transmission controlling section 184 controls the automatic transmission 168 to shift down the shift gear stage by one stage in response to the operation of the shift down switch 104 detected at step S61.

Then, the operational state discrimination section 214 decides the operational state of the motorcycle 12 upon the shift down operation (manual operation for shift down) (step S63). The operational state discrimination section 214 uses the operational state discrimination map 232 to decide the operational state of the motorcycle 12 upon the shift down operation from the throttle opening and the vehicle speed upon the shift down operation. This throttle opening is detected by the throttle opening sensor 172, and the vehicle speed is detected by the vehicle speed sensor 178.

Then, the returning condition decision section 216 decides whether or not the operational state of the motorcycle 12 upon the shift down operation belongs to the acceleration operational region (step S64). In particular, the returning condition decision section 216 decides whether or not the throttle opening and the vehicle speed upon the shift down operation are included in the acceleration operational region. In other words, the returning condition decision section 216 decides whether or not the operational state of the motorcycle 12 decided at step S63 is an operational state in the acceleration operational region.

If it is decided at step S64 that the operational state of the motorcycle 12 upon the shift down operation is an operational state which belongs to the acceleration operational region, then the operational state discrimination section 214 decides the operational state at present using the operational state discrimination map 232 (step S65). In other words, the operational state discrimination section 214 decides the operational state of the motorcycle 12 at present from the throttle opening and the vehicle speed at present.

Then, the returning condition decision section 216 decides whether or not the operational state of the motorcycle 12 after the shift down operation is an operational state belonging to the acceleration operational region (step S66). In particular, the returning condition decision section 216 decides whether or not the throttle opening and the vehicle speed at present are included in the acceleration operational region of the operational state discrimination map 232. In other words, the returning condition decision section 216 decides whether or not the operational state of the motorcycle 12 decided latest at step S65 is an operational state in the acceleration operational region.

If it is decided at step S66 that the operational state of the motorcycle 12 after the shift down operation is an operational state belonging to the acceleration operational region, then the returning condition decision section 216 decides whether or not a predetermined time period for individual gear acceleration (first predetermined time period) elapses after the operational state belonging to the acceleration operational region is entered (step S67).

The predetermined time period for individual gear acceleration is a predetermined time period determined in response to each shift gear stage, and the returning condition decision section 216 makes a decision using a predetermined time period for individual gear acceleration corresponding to the shift gear stage of the automatic transmission 168 at present. For example, if the shift gear stage of the automatic transmission 168 at present is the third speed, then the returning condition decision section 216 makes a decision using the predetermined time period for individual gear acceleration determined in accordance with the third speed. Such predetermined time periods for individual gear acceleration are stored in the storage section 124, and the predetermined time period for individual gear acceleration is longer in time for a shift gear state for a lower speed (nearer to the first speed). The shift gear stage at present is detected by the gear position sensor 176.

If it is decided at step S67 that the predetermined time period for individual gear acceleration does not elapse after the operational state belonging to the acceleration operational region is entered, then the processing returns to step S65. However, if it is decided at step S67 that the predetermined time period for individual gear acceleration elapses after the operational state belonging to the acceleration operational region is entered, then the returning condition decision section 216 decides whether or not the vehicle speed and the throttle opening at present reach the vehicle speed and the throttle opening with which the automatic transmission 168 is to be shifted up based on the automatic shift map 230 (step S68). As the automatic shift map 230 to be used in the decision at step S68, the automatic shift map 230 used in the automatic shift mode in the preceding operation cycle is used.

If it is decided at step S68 that the vehicle speed and the throttle opening at present do not reach the vehicle speed and the throttle opening with which the automatic transmission 168 is to be shifted up based on the automatic shift map 230, then the processing returns to step S65.

On the other hand, if it is decided at step S68 that the vehicle speed and the throttle opening at present reach the vehicle speed and the throttle opening with which the automatic transmission 168 is to be shifted up based on the automatic shift map 230, then the processing advances to step S9 of FIG. 12, at which the shift mode is automatically returned to the automatic shift mode. Since the vehicle speed and the throttle opening at present reach the vehicle speed and the throttle opening with which the automatic transmission 168 is to be shifted up based on the automatic shift map 230, when the shift mode automatically returns to the automatic shift mode, the automatic transmission controlling section 184 controls the automatic transmission 168 to shift up the shift gear stage.

More particularly, if the operational state of the motorcycle 12 upon the shift down operation is an operational state in the acceleration operational region and the operational state of the motorcycle 12 after the shift down operation is the operational state in the acceleration operational region continuously for the predetermined time period for individual gear acceleration and besides the vehicle speed and the throttle opening at present reach the vehicle speed and the throttle opening with which the automatic transmission 168 is to be shifted up based on the automatic shift map 230, then the returning condition decision section 216 decides that the automatic returning condition is satisfied. Thus, the automatic shift mode returning section 218 automatically returns the shift mode to the automatic shift mode.

If the operational state of the motorcycle 12 upon the shift down operation is an operational state in the acceleration operational region and the operational state of the motorcycle 12 after the shift down operation is the operational state in the acceleration operational region, then it is considered that the driver wants to carry out strong acceleration by shift down. Therefore, when the predetermined time period for individual gear acceleration elapses in the operational state in the acceleration operational region and the vehicle speed and the throttle opening at present become the vehicle speed and the throttle opening with which shift up is to be carried out, the shift mode is returned to the automatic shift mode finally and shift up is carried out. Therefore, such a situation that shift up is carried out immediately and strong acceleration does not continue can be prevented, and the request for strong acceleration of the driver can be satisfied. Further, since the predetermined time for individual gear acceleration is shorter with a shift gear stage for a lower speed, the expectation of the driver who requests stronger acceleration for a lower speed gear position can be satisfied.

If it is decided at step S66 that the operational state of the motorcycle 12 after the shift down operation is not an operational state belonging to the acceleration operational region, then the processing advances to step S71, at which the returning condition decision section 216 decides whether or not the operational state of the motorcycle 12 after the shift down operation is an operational state belonging to the cruise operational region. In other words, the returning condition decision section 216 decides whether or not the operational state of the motorcycle 12 decided latest at step S65 is an operational state in the cruise operational region.

If it is decided at step S71 that the operational state of the motorcycle 12 after the shift down operation is an operational state belonging to the cruise operational region, then the returning condition decision section 216 decides whether or not the predetermined time period for cruise (third predetermined time period) elapses after the operational state belonging to the cruise operational region is entered (step S72).

If it is decided at step S72 that the predetermined time period for cruise does not elapse after the operational state belonging to the cruise operational region is entered, then the processing returns to step S65 of FIG. 16. However, if it is decided at step S72 that the predetermined time period for cruise elapses after the operational state belonging to the cruise operational region is entered, then the processing advances to step S9 of FIG. 12, at which the automatic shift mode returning section 218 automatically returns the shift mode to the automatic shift mode. After the shift mode is returned to the automatic shift mode, the automatic transmission controlling section 184 controls the automatic transmission 168 to change over the shift gear stage based on the automatic shift map 230.

In particular, if the operational state of the motorcycle 12 upon the shift down operation is an operational state in the acceleration operational region and the operational state of the motorcycle 12 after the shift down operation is an operational state in the cruise operational region continuously for the predetermined time period for cruise, then the returning condition decision section 216 decides that the automatic returning condition is satisfied. Thus, the automatic shift mode returning section 218 automatically returns the shift mode to the automatic shift mode.

If the operational state of the motorcycle 12 upon the shift down operation is an operational state in the acceleration operational region and then an operational state in the cruise operational region state is entered, then it is considered that the driver wants to carry out a cruise operation with the shift gear stage after the shift down operation. Therefore, until the operational state in the cruise operation region continues for the predetermined time period for cruise, the shift mode is not automatically returned to the automatic shift mode. Therefore, cruise operation can be carried out with the shift gear stage after the shift up operation. Further, the shift gear stage of the automatic transmission 168 does not change over frequently, and an unfamiliar feeling by frequent speed change is not provided to the driver.

On the other hand, if it is decided at step S71 that the operational state of the motorcycle 12 after the shift down operation is not an operational state belonging to the cruise operational region, or in other words, if the operational state of the motorcycle 12 after the shift down operation is an operational state belonging to the deceleration operational region, then the returning condition decision section 216 decides whether or not the predetermined time period for deceleration (second predetermined time period) elapses after the operational state belonging to the deceleration operational region is entered (step S73).

If it is decided at step S73 that the predetermined time period for deceleration does not elapse after the operational state belonging to the deceleration operational region is entered, then the processing returns to step S65 of FIG. 16. However, if it is decided that the predetermined time period for deceleration elapses after the operational state belonging to the deceleration operational region is entered, then the processing advances to step S9 of FIG. 12, at which the automatic shift mode returning section 218 automatically returns the shift mode to the automatic shift mode. After the shift mode is returned to the automatic shift mode, the automatic transmission controlling section 184 controls the automatic transmission 168 to change over the shift gear stage based on the automatic shift map 230.

More particularly, if the operational state of the motorcycle 12 upon the shift down operation is an operational state in the acceleration operational region and the operational state of the motorcycle 12 after the shift down operation is an operational state in the deceleration operational region continuously for the predetermined time period for deceleration, then the returning condition decision section 216 decides that the automatic returning condition is satisfied. Thus, the automatic shift mode returning section 218 returns the shift mode to the automatic shift mode.

If the operational state of the motorcycle 12 upon the shift down operation is an operational state in the acceleration operational region and then enters an operational state in the deceleration operational region, then it is considered that the driver wants to carry out a deceleration operation with the shift gear stage after the shift down operation. Therefore, until the operational state in the deceleration operational region continues for the predetermined time period for deceleration, the shift mode is not returned to the automatic shift mode. Therefore, deceleration operation can be carried out with the shift gear stage after the shift down operation. Further, the shift gear stage of the automatic transmission 168 does not change over frequently, and an unfamiliar feeling by frequent speed change is not provided to the driver.

If it is decided at step S64 of FIG. 16 that the operational state of the motorcycle 12 upon the shift down operation is not an operational state belonging to the acceleration operational region, then the processing advances to step S81 in FIG. 18, at which the returning condition decision section 216 decides whether or not the operational state of the motorcycle 12 upon the shift down operation is an operational state belonging to the cruise operational region. In other words, the returning condition decision section 216 decides whether or not the operational state decided at step S63 of FIG. 16 is an operational state in the cruise operational region.

If it is decided at step S81 that the operational state of the motorcycle 12 upon the shift down operation is an operational state belonging to the cruise operational region, then the operational state discrimination section 214 decides the operational state at present using the operational state discrimination map 232 (step S82). In other words, the operational state discrimination section 214 decides the operational state of the motorcycle 12 at present from the throttle opening and the vehicle speed at present.

Then, the returning condition decision section 216 decides whether or not the operational state of the motorcycle 12 after the shift down operation is an operational state belonging to the acceleration operational region (step S83). In other words, the returning condition decision section 216 decides whether or not the operational state of the motorcycle 12 decided latest at step S82 is an operational state in the acceleration operational region.

If it is decided at step S83 that the operational state of the motorcycle 12 after the shift down operation is an operational state belonging to the acceleration operational region, then the returning condition decision section 216 decides whether or not the predetermined time period for individual gear acceleration (first time period) elapses after the operational state belonging to the acceleration operational region is entered (step S84).

If it is decided at step S84 that the predetermined time period for individual gear acceleration does not elapse after the operational state belonging to the acceleration operational region is entered, the processing returns to step S82. On the other hand, if it is decided at step S84 that the predetermined time period for individual gear acceleration elapses after the operational state belonging to the acceleration operational region is entered, then the returning condition decision section 216 decides whether or not the vehicle speed and the throttle opening at present reach the vehicle speed and the throttle opening (shift timing) with which the automatic transmission 168 is to be shifted up based on the automatic shift map 230 (step S85). As the automatic shift map 230 to be used in the decision at step S85, the automatic shift map 230 used in the automatic shift mode in the preceding operation cycle is used.

If it is decided at step S85 that the vehicle speed and the throttle opening at present do not reach the vehicle speed and the throttle opening with which the automatic transmission 168 is to be shifted up based on the automatic shift map 230, then the processing returns to step S82.

On the other hand, if it is decided at step S85 that the vehicle speed and the throttle opening at present reach the vehicle speed and the throttle opening with which the automatic transmission 168 is to be shifted up based on the automatic shift map 230, then the processing advances to step S9 of FIG. 12, at which the shift mode is automatically returned to the automatic shift mode. Since the vehicle speed and the throttle opening already reach the vehicle speed and the throttle opening with which the automatic transmission 168 is to be shifted up based on the automatic shift map 230, after the shift mode is automatically returned to the automatic shift mode, the automatic transmission controlling section 184 controls the automatic transmission 168 to shift up the shift gear stage.

More particularly, if the operational state of the motorcycle 12 upon the shift down operation is an operational state in the cruise operational region and the operational state of the motorcycle 12 after the shift down operation is an operational state in the acceleration operational region continuously for the predetermined time period for individual gear acceleration and besides the vehicle speed and the throttle opening at present reach the vehicle speed and the throttle opening with which the automatic transmission 168 is to be shifted up based on the automatic shift map 230, then the returning condition decision section 216 decides that the automatic returning condition is satisfied. Thus, the automatic shift mode returning section 218 returns the shift mode to the automatic shift mode.

If the operational state of the motorcycle 12 upon the shift down operation is an operational state in the cruise operational state and the operational state of the motorcycle 12 after the shift down operation is an operational state in the acceleration operational region, then it is considered that the driver wants to carry out strong acceleration by shift down. Therefore, when the predetermined time period for individual gear acceleration elapses in the operational state in the acceleration operational region and the vehicle speed and the throttle opening at present become the vehicle speed and the throttle opening with which shift up is to be carried out, the shift mode is returned to the automatic shift mode finally and shift up is carried out. Therefore, such a situation that shift up is carried out immediately and strong acceleration does not continue can be prevented, and the request for strong acceleration of the driver can be satisfied.

On the other hand, if it is decided at step S83 that the operational state of the motorcycle 12 after the shift down operation is not an operational state belonging to the acceleration operational region, then the returning condition decision section 216 decides whether or not the operational state of the motorcycle 12 after the shift down operation is an operational state belonging to the cruise operational region (step S86). In other words, the returning condition decision section 216 decides whether or not the operational state of the motorcycle 12 decided latest is an operational state in the cruise operational region.

If it is decided at step S86 that the operational state of the motorcycle 12 after the shift down operation is an operational state belonging to the cruise operational region, then the returning condition decision section 216 decides whether or not the predetermined time period for cruise (third predetermined time period) elapses after the operational state belonging to the cruise operational region is entered after the shift down operation (step S87).

If it is decided at step S87 that the predetermined time period for cruise does not elapse after the operational state belonging to the cruise operational region is entered after the shift down operation, then the processing returns to step S82. However, if it is decided that the predetermined time period for cruise elapses after the operational state belonging to the cruise operational region is entered after the shift down operation, then the processing advances to step S9 of FIG. 12, at which the automatic shift mode returning section 218 automatically returns the shift mode to the automatic shift mode. After the shift mode is returned to the automatic shift mode, the automatic transmission controlling section 184 controls the automatic transmission 168 to change over the shift gear stage based on the automatic shift map 230.

More particularly, if the operational state of the motorcycle 12 upon the shift down operation is an operational state in the cruise operational region and the operational state of the motorcycle 12 after the shift down operation is an operational state in the cruise operational region continuously for the predetermined time period for cruise, then the returning condition decision section 216 decides that the automatic returning condition is satisfied. Thus, the automatic shift mode returning section 218 returns the shift mode to the automatic shift mode.

If the operational state of the motorcycle 12 upon the shift down operation is an operational state in the cruise operational region and the operational state of the motorcycle 12 after the shift down operation is an operational state in the cruise operational region, then it is considered that the driver wants to carry out the cruise operation with the shift gear stage after the shift down operation. Therefore, until the operational state in the cruise operational region continues for the predetermined time period for cruise, the shift mode does not automatically return to the automatic shift mode. Therefore, the motorcycle 12 can carry out the cruise operation with the shift gear stage after the shift down operation. Further, the shift gear stage of the automatic transmission 168 does not change over frequently, and an unfamiliar feeling by frequent speed change is not provided to the driver.

On the other hand, if it is determined at step S86 that the operational state of the motorcycle 12 after the shift down operation does not belong to an operational state in the cruise operational region, that is, if the operational state of the motorcycle 12 after the shift down operation belongs to an operational state in the deceleration operational region, then the returning condition decision section 216 decides whether or not the predetermined time period for deceleration (second predetermined time period) elapses after the operational state belonging to the deceleration operational region is entered after the shift down operation (step S88).

If it is decided at step S88 that the predetermined time period for deceleration does not elapse after the operational state belonging to the deceleration operational region is entered, then the processing returns to step S82. However, if it is decided that the predetermined time period for deceleration elapses after the operational state belonging to the deceleration operational region is entered, then the processing advances to step S9 of FIG. 12, at which the automatic shift mode returning section 218 automatically returns the shift mode to the automatic shift mode. After the shift mode is returned to the automatic shift mode, the automatic transmission controlling section 184 controls the automatic transmission 168 to change over the shift gear stage based on the automatic shift map 230.

More particularly, if the operational state of the motorcycle 12 upon the shift down operation is an operational state in the cruise operational region and the operational state of the motorcycle 12 after the shift down operation is an operational state in the deceleration operational region continuously for the predetermined time period for deceleration, then the returning condition decision section 216 decides that the automatic returning condition is satisfied. Thus, the automatic shift mode returning section 218 returns the shift mode to the automatic shift mode.

If the operational state of the motorcycle 12 upon the shift down operation is an operational state in the cruise operational region and thereafter an operational state in the deceleration operational region is entered, then it is considered that the driver wants to carry out the deceleration operation with the shift gear stage after the shift down operation. Therefore, until the operational state in the deceleration operational region continues for the predetermined time period for deceleration, the shift mode is not returned to the automatic shift mode. Therefore, the deceleration operation can be carried out with the shift gear stage after the shift down operation. Further, the shift gear stage of the automatic transmission 168 does not change over frequently, and an unfamiliar feeling by frequent speed change is not provided to the driver.

If it is decided at step S81 that the operational state of the motorcycle 12 upon the shift down operation is not an operational state belonging to the cruise operational region, that is, if the operational state of the motorcycle 12 upon the shift down operation is an operational state belonging to the deceleration operational region, then the processing advances to step S100 of FIG. 19, at which the operational state discrimination section 214 decides the operational state at present using the operational state discrimination map 232. In other words, the operational state discrimination section 214 decides the operational state of the motorcycle 12 at present from the throttle opening and the vehicle speed at present.

Then, the returning condition decision section 216 decides whether or not the operational state of the motorcycle 12 after the shift down operation is an operational state belonging to the acceleration operational region (step S101). In other words, the returning condition decision section 216 decides whether or not the operational state decided latest at step S100 is an operational state belonging to the acceleration operational region.

If it is decided that the operational state of the motorcycle 12 after the shift down operation is an operational state belonging to the acceleration operational region, then the processing advances to step S9 of FIG. 12, at which the automatic shift mode returning section 218 automatically returns the shift mode to the automatic shift mode. After the shift mode is returned to the automatic shift mode, the automatic transmission controlling section 184 controls the automatic transmission 168 to change over the shift gear stage based on the automatic shift map 230.

More particularly, if the operational state of the motorcycle 12 upon the shift down operation is an operational state in the deceleration operational region and an operational state in the acceleration operational region is entered after the shift down operation, then the returning condition decision section 216 decides that the automatic returning condition is satisfied. Thus, the automatic shift mode returning section 218 returns the shift mode to the automatic shift mode.

If the operational state of the motorcycle 12 upon the shift down operation is an operational state in the deceleration operational region and an operational state in the acceleration operational region is entered after the shift down operation, then since it is considered that the driver wants to carry out kick down, the shift mode is automatically returned to the automatic shift mode. Consequently, the automatic transmission controlling section 184 is permitted to execute kick down based on the automatic shift map 230 and can satisfy a strong acceleration request of the driver.

On the other hand, if it is decided at step S101 that the operational state of the motorcycle 12 after the shift down operation is not an operational state belonging to the acceleration operational region, then the returning condition decision section 216 decides whether or not the operational state of the motorcycle 12 after the shift down operation is an operational state belonging to the cruise operational region (step S102). In other words, the returning condition decision section 216 decides whether or not the operational state decided latest at step S100 is an operational state belonging to the cruise operational region.

If it is decided at step S102 that the operational state of the motorcycle 12 after the shift down operation is an operational state belonging to the cruise operational region, then the returning condition decision section 216 decides whether or not the predetermined time period for cruise (third predetermined time period) elapses after the operational state belonging to the cruise operational region is entered after the shift down operation (step S103).

If it is decided at step S103 that the predetermined time period for cruise does not elapse after the operational state belonging to the cruise operational region is entered, then the processing returns to step S100. However, if it is decided that the predetermined time period for cruise elapses after the operational state belonging to the cruise operational region is entered, then the processing advances to step S9 of FIG. 12, at which the automatic shift mode returning section 218 automatically returns the shift mode to the automatic shift mode. After the shift mode is returned to the automatic shift mode, the automatic transmission controlling section 184 controls the automatic transmission 168 to change over the shift gear stage based on the automatic shift map 230.

More particularly, if the operational state of the motorcycle 12 upon the shift down operation is an operational state in the deceleration operational region and the operational state of the motorcycle 12 after the shift down operation is an operational state in the cruise operational region continuously for the predetermined time period for cruise, then the returning condition decision section 216 decides that the automatic returning condition is satisfied. Thus, the automatic shift mode returning section 218 automatically returns the shift mode to the automatic shift mode.

If the operational state of the motorcycle 12 upon the shift down operation is an operational state in the deceleration operational region and the operational state of the motorcycle 12 after the shift down operation is an operational state in the cruise operational region, then it is considered that the driver wants to carry out the cruise operation with the shift gear stage after the shift down operation. Therefore, until the operational state in the cruise operational region continues for the predetermined time period for cruise, the shift mode is not returned to the automatic shift mode. Therefore, the cruise operation can be carried out with the shift gear stage after the shift down operation. Further, the shift gear stage of the automatic transmission 168 does not change over frequently, and an unfamiliar feeling by frequent speed change is not provided to the driver.

On the other hand, if it is decided at step S102 that the operational state of the motorcycle 12 after the shift down operation does not belong to the cruise operational region, that is, if the operational state of the motorcycle 12 after the shift down operation belongs to an operational state in the deceleration operational region, then the returning condition decision section 216 decides whether or not the vehicle speed at present is lower than the compulsory shift down vehicle speed (step S104).

If it is decided at step S104 that the vehicle speed at present is not lower than the compulsory shift down vehicle speed, then the processing returns to step S100. However, if it is decided that the vehicle speed at present is lower than the compulsory shift down vehicle speed, then the processing advances to step S9 of FIG. 12, at which the automatic shift mode returning section 218 automatically returns the shift mode to the automatic shift mode. After the shift mode is returned to the automatic shift mode, the automatic transmission controlling section 184 controls the automatic transmission 168 to change over the shift gear stage based on the automatic shift map 230.

More particularly, if the operational state of the motorcycle 12 upon the shift down operation is an operational state in the deceleration operational region and the operational state of the motorcycle 12 after the shift down operation is an operational state in the deceleration operational region and besides the vehicle speed is lower than the compulsory shift down vehicle speed, then the returning condition decision section 216 decides that the automatic returning condition is satisfied. Thus, the automatic shift mode returning section 218 returns the shift mode to the automatic shift mode.

Since whether or not the automatic returning condition to the automatic shift mode is satisfied is decided from a manual shift operation for shift up or shift down and operational states upon and after the manual shift operation as described above, if the automatic returning condition is satisfied, then the shift mode is automatically returned to the automatic shift mode. Therefore, the shift mode can be automatically returned to the automatic shift mode in accordance with an operational request of the driver. Thus, the shift mode can be automatically returned to the automatic shift mode without giving an unfamiliar feeling to the driver.

Now, a changeover operation between the default mode and the quick mode is described with reference to FIG. 20.

The operation illustrated in FIG. 20 is executed in a predetermined cycle when the motorcycle 12 operates in the automatic shift mode of the drive mode. The drive mode changeover section 222 decides whether or not a quick mode changeover condition is satisfied (step S121). If the quick mode changeover condition is not satisfied, then at present, the automatic shift mode of the drive mode is set to the default mode, but if the quick mode changeover condition is satisfied, then the automatic shift mode of the drive mode is set to the quick mode.

If it is decided at step S121 that the quick mode changeover condition is not satisfied (if it is decided that the automatic shift mode of the drive mode is the default mode at present), then the drive mode changeover section 222 decides whether or not the motorcycle 12 enters an operational state in the acceleration operational region (step S122). In other words, the drive mode changeover section 222 decides whether or not the operational state of the motorcycle 12 at present has entered (changed to) an operational state in the acceleration operational region from an operational state in the cruse operational region or from an operational state in the deceleration operational region. More particularly, the operational state discrimination section 214 decides the operational state of the motorcycle 12 in the predetermined cycle, and the drive mode changeover section 222 decides based on a result of the decision whether or not the operational state of the motorcycle 12 at present has entered an operational state in the acceleration operational region. It is to be noted that the operational state discrimination section 214 naturally uses the operational state discrimination map 232 to decide the operational state from the throttle opening and the vehicle speed at present.

If it is decided at step S122 that the operational state of the motorcycle 12 at present has not entered an operational state in the acceleration operational region, then the processing is ended, but if it is decided that the operational state of the motorcycle 12 at present has entered an operational state in the acceleration operational region, then the drive mode changeover section 222 decides whether or not the entering into the acceleration operational region within a fixed period of time (for example, within five seconds) has been carried out by three times (a predetermined number of times) or more (step S123). In other words, the drive mode changeover section 222 decides whether or not the operation that, after an operational state in the acceleration operational region is entered, the operational state of the motorcycle 12 at present is once brought out of the operational state in the acceleration operational region and then enters an operational state in the acceleration operational region within the fixed period of time is carried out successively, and the number of times by which the acceleration operational region is entered is three or more.

More particularly, if an operational state in the acceleration operational region is entered→the operational state in the acceleration operational region is stopped an operational state in the acceleration operational region is entered again within the fixed period of time after the timing at which the operational state in the acceleration operational region in the preceding cycle the operational state in the acceleration operational region is stopped→an operational state in the acceleration operational region is entered again within the fixed period of time after the timing at which the operational state in the acceleration operational region is entered in the preceding cycle, then the drive mode changeover section 222 decides that the entering into the acceleration operational region within the fixed period of time has been carried out successively by three times or more.

Figure 22:
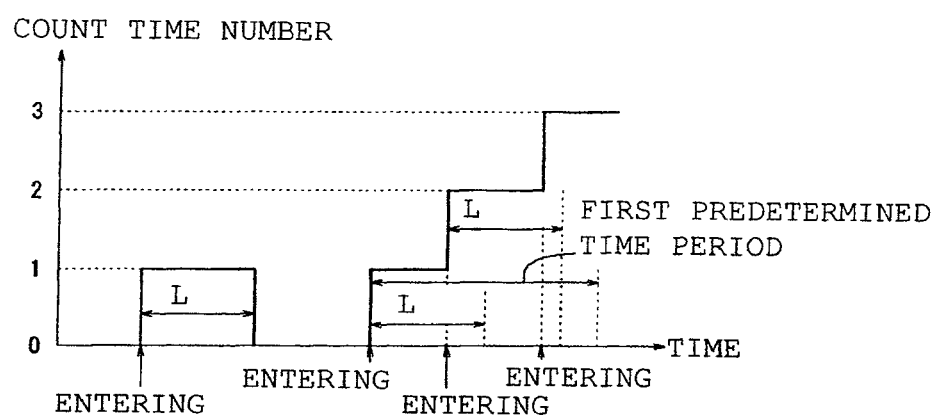
FIG. 22 is a view illustrating a decision regarding entering into an acceleration operational region within a fixed period of time has been carried out successively by three times or more.

More particularly, as seen in FIG. 22, the drive mode changeover section 222 counts the number of times by which the motorcycle 12 enters an operational state in the acceleration operational region, and resets, if the motorcycle 12 does not enter an operational state in the acceleration operational region within the fixed period of time after the operational state in the acceleration operational region is entered, the counted number of times (to zero). Then, if the counted time number is three or more, then the drive mode changeover section 222 decides that the entering into the acceleration operational region within the fixed period of time has been carried out successively by three times or more.

In other words, in order for the drive mode changeover section 222 to decide that the entering into the acceleration operational region within the fixed period of time has been carried out successively by three times or more, it is necessary to enter an operational state in the acceleration operational region at least by three times or more within a first predetermined time period (fixed period of time×2) and besides it is necessary for the distance between two successive timings at which an operational state in the acceleration operational region is entered to be within the fixed period of time. As for a case in which the entering into the acceleration operational region within the fixed period of time is carried out successively by three times or more, a case may be applicable in which, for example, the driver successively operates the throttle grip 72 to open and close in a short period of time. It is to be noted that, while it is decided at step S123 whether or not the entering into the acceleration operational region within the fixed period of time is carried out successively by three times or more, the number of such times may be a suitable number of times equal to or more than two.

If it is decided at step S123 that the entering into the acceleration operational region within the fixed period of time is not carried out successively by three times or more, then the processing is ended. However, if it is decided that the entering into the acceleration operational region within the fixed period of time is carried out successively by three times or more, then the drive mode changeover section 222 decides that the quick mode changeover condition is satisfied (step S124).

Then, the drive mode changeover section 222 automatically changes over the automatic shift mode of the drive mode from the default mode to the quick mode (step S125) and then ends the processing. At this time, the drive mode changeover section 222 automatically changes over the shift map from the default mode shift map 250 to the quick mode shift map 252 to automatically change over the automatic shift mode of the drive mode from the default mode to the quick mode. Consequently, if the automatic shift mode of the drive mode is selected, then the automatic transmission controlling section 184 changes over the shift gear stage of the automatic transmission 168 using the quick mode shift map 252.

Along a road over a mountain pass along which a corner successively appears, the speed of the motorcycle 12 is decreased when it advances to a corner but is increased when it leaves the corner, and therefore, an operation of the throttle grip 72 is carried out frequently and deceleration and acceleration are repeated within a predetermined period of time. Therefore, when the motorcycle 12 operates along a road over a mountain pass or the like, it is decided at step S123 that the number of times by which the motorcycle 12 enters an operational state in the acceleration operational region within the fixed period of time is three times or more, and then the quick mode which attaches importance to the driving force is entered automatically at step S125. Therefore, the necessity for the driver to select the sport mode is eliminated, and the convenience in use is enhanced and driving becomes easy while racy operational can be implemented.

If the acceleration operational region is entered again within the fixed period of time after an operational state in the acceleration operational region is entered once, then an operation of the throttle grip 72 is not carried out frequently, and it can be considered that the operation then is not a cornering operational. Therefore, changeover to the quick mode can be prevented by resetting the counter.

On the other hand, if it is decided at step S121 that the quick mode changeover condition is satisfied, then it is decided whether or not the operational state of the motorcycle 12 at present is an operational state in the cruise operational state (step S126). In other words, the operational state discrimination section 214 decides the operational state of the motorcycle 12 in the predetermined cycle and decides, based on a result of the decision, whether or not the operational state of the motorcycle 12 at present is an operational state in the cruise operational region.

If it is decided at step S126 that the operational state of the motorcycle 12 at present is not an operational state in the cruise operational region, then the processing is ended, but if the operational state of the motorcycle 12 at present is an operational state in the cruise operational region, then the drive mode changeover section 222 decides whether or not the operational state in the cruise operational region continues for a second predetermined time period (for example, for eight seconds) (step S127).

If it is decided at step S127 that the operational state in the cruise operational region does not continue for the second predetermined time period, then the processing is ended, but if it is decided that the operational state in the cruise operational region continues for the second predetermined period of time, then the drive mode changeover section 222 decides that the default mode changeover condition is satisfied (step S128).

Then, the drive mode changeover section 222 changes over the automatic shift mode of the drive mode from the quick mode to the default mode (step S129) and then ends the processing. At this time, the drive mode changeover section 222 automatically changes over the shift map from the quick mode shift map 252 to the default mode shift map 250 to automatically change over the automatic shift mode of the drive mode from the quick mode to the default mode. Consequently, if the automatic shift mode of the drive mode is selected, then the automatic transmission controlling section 184 uses the default mode shift map 250 to change over the shift gear stage of the automatic transmission 168.

If the state of the cruise operational region continues for the second predetermined time period, then the driver can decide that, for example, the motorcycle 12 is operational comfortably in the city or the like. Therefore, operational conforming to the will of the driver can be carried out by automatically changing over the automatic shift mode of the drive mode to the default mode.

It is to be noted that, if an by the instruction of the sport mode is issued from the ND changeover switch 88 by an operation driver, then the drive/sport mode selection section 220 selects the sport mode shift map 242 to select the automatic shift mode of the sport mode. Consequently, the sport mode can be selected when the will of the driver is recognized with certainty. It is to be noted that, where the automatic shift mode of the sport mode is selected, the automatic transmission controlling section 184 changes over the shift gear stage of the automatic transmission 168 using the sport mode shift map 242.

As described above, when the automatic shift mode of the drive mode is selected (set), changeover between the default mode and the quick mode is carried out based on an acceleration history based on the throttle opening. Therefore, in a wide range operational state in operational along an uphill and a downhill such as a road over a mountain path from operation in the city, appropriate operation can be provided without using gradient detection means or the like and the necessity for complicated shift operations is eliminated. In addition, a smooth operation can be implemented.

It is to be noted that, while, in the embodiment described above, the single operational state discrimination map 232 is provided and the operational state discrimination section 214 uses the single operational state discrimination map 232 to discriminate an operational state of the motorcycle 12, the operational state discrimination map 232 may be provided for each shift gear stage. In this instance, the operational state discrimination section 214 may use the operational state discrimination map 232 corresponding to the shift gear stage of the automatic transmission 168 at present to discriminate the operational state of the motorcycle 12. By this, discrimination of the operational state of the motorcycle 12 can be enhanced.

While the present invention has been described in connection with the preferred embodiment thereof, the technical scope of the present invention is not limited to the scope of the description of the embodiment. It is apparent to those skilled in the art that it is possible to apply various alterations and improvements. It is apparent from the description of the claims that also such forms to which alterations or improvements are applied as just described can be included in the technical scope of the present invention. Further, reference numerals in parentheses described in the claims are applied in accordance with reference numerals applied in the accompanying drawings in order to facilitate understandings of the present invention, but the present invention shall not be interpreted as being restricted to the elements to which the reference numerals are applied.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A shift controlling apparatus for a transmission, comprising:
   an automatic transmission controlling section having an automatic shift mode returning means;
   the automatic shift mode returning means having a manual shift mode; and
   when a manual shift operation is carried out in an automatic shift mode, at least shift timings of the transmission corresponding to different vehicle speeds are set, and the shift controlling apparatus changes the shift mode to the manual shift mode, and then automatically returns the shift mode to the automatic shift mode after the manual shift operation,
   wherein automatic transmission controlling section of the shift controlling apparatus also includes:
      manual operation detection means for detecting the manual shift operation for shift up or shift down of the transmission during the automatic shift mode;
      first operational state discrimination means for discriminating an operational state of a vehicle when the manual shift operation is carried out; and
      second operational state discrimination means for discriminating an operational state of the vehicle after the manual shift operation; and
      a state of automatic return to the automatic shift mode is changed over at least from the manual shift operation for shift up or shift down of the transmission and the operational states of the vehicle, upon and after the manual shift operation,
   wherein said first operational state discrimination means and said second operational state discrimination means decide to which one of an acceleration operational region, a deceleration operational region, and a cruise operational region the operational state belongs, and
   if the operational state of the vehicle upon the manual shift operation belongs to the acceleration operational region or the cruise operational region, another manual shift operation for shifting down the transmission is carried out, and then the operational state after the manual shift operation belongs to the acceleration operational region, the automatic shift mode returning means is adapted to not automatically return the shift mode to the automatic shift mode until a shift timing, at which the transmission is shifted upwardly based on an automatic shift map after a first predetermined time period elapses after the operational state in the acceleration operational region is entered.

2. The shift controlling apparatus according to claim 1, wherein said automatic shift mode returning means does not automatically return, if the operational state upon the manual shift operation belongs to the acceleration operational region and another manual shift operation for shifting up the transmission is carried out and then the operational state after the manual shift operation belongs to the acceleration operational region, the shift mode shifts to the automatic shift mode when a shift timing at which the transmission is to be shifted up is based on the automatic shift map.

3. The shift controlling apparatus according to claim 1, wherein said automatic shift mode returning means automatically returns the shift mode to the automatic shift mode if the operational state upon the manual shift operation belongs to the acceleration operational region another manual shift operation for shifting upon the transmission is carried out and then, after the operational state after the manual shift operation is placed out of the operational state in the acceleration operational region once, an operational state in the acceleration operational region is established again.

4. The shift controlling apparatus according to claim 2, wherein said automatic shift mode returning means automatically returns the shift mode to the automatic shift mode if the operational state upon the manual shift operation belongs to the acceleration operational region another manual shift operation for shifting upon the transmission is carried out and then, after the operational state after the manual shift operation is placed out of the operational state in the acceleration operational region once, an operational state in the acceleration operational region is established again.

5. The shift controlling apparatus according to claim 1, wherein the first predetermined time period depends upon a shift gear stage after the manual shift operation and is shorter at a shift gear stage for a lower speed.

6. The shift controlling apparatus according to claim 1, wherein said automatic shift mode returning means automatically returns, when the operational state upon the manual shift operation belongs to the acceleration operational region or the cruise operational region and the operational state after the manual shift operation belongs to the deceleration operational region, the shift mode to the automatic shift mode when a second predetermined time period elapses after the operational state in the deceleration operational region is entered.

7. The shift controlling apparatus according to claim 2, wherein said automatic shift mode returning means automatically returns, when the operational state upon the manual shift operation belongs to the acceleration operational region or the cruise operational region and the operational state after the manual shift operation belongs to the deceleration operational region, the shift mode to the automatic shift mode when a second predetermined time period elapses after the operational state in the deceleration operational region is entered.

8. The shift controlling apparatus according to claim 3, wherein said automatic shift mode returning means automatically returns, when the operational state upon the manual shift operation belongs to the acceleration operational region or the cruise operational region and the operational state after the manual shift operation belongs to the deceleration operational region, the shift mode to the automatic shift mode when a second predetermined time period elapses after the operational state in the deceleration operational region is entered.

9. The shift controlling apparatus according to claim 1, wherein said automatic shift mode returning means automatically returns the shift mode to the automatic shift mode if the operational state upon the manual shift operation belongs to the deceleration operational region and the operational state after the manual shift operation belongs to the acceleration operational region.

10. The shift controlling apparatus according to claim 3, wherein said automatic shift mode returning means automatically returns the shift mode to the automatic shift mode if the operational state upon the manual shift operation belongs to the deceleration operational region and the operational state after the manual shift operation belongs to the acceleration operational region.

11. The shift controlling apparatus according to claim 1, wherein said automatic shift mode returning means automatically returns, to whichever one of the operational regions the operational state upon the manual shift operation belongs, if a manual shift operation for shifting down the transmission is carried out and the operational state after the manual shift operation belongs to the cruise operational region, the shift mode to the automatic shift mode when a third predetermined time period elapses after the operational state in the cruise operational region is entered.

12. The shift controlling apparatus according to claim 2, wherein said automatic shift mode returning means automatically returns, to whichever one of the operational regions the operational state upon the manual shift operation belongs, if a manual shift operation for shifting down the transmission is carried out and the operational state after the manual shift operation belongs to the cruise operational region, the shift mode to the automatic shift mode when a third predetermined time period elapses after the operational state in the cruise operational region is entered.

13. The shift controlling apparatus according to claim 1, wherein said automatic shift mode returning means automatically returns, to whichever one of the operational regions the operational state upon the manual shift operation belongs, if a manual shift operation for shifting up the transmission is carried out and the operational state after the manual shift operation belongs to the cruise operational region, the shift mode to the automatic shift mode when a fourth predetermined time period elapses after the operational state in the cruise operational region is entered or when a shift timing at which the transmission is to be shifted up based on the automatic shift map.

* * * * *